United States Patent

Yoshimura et al.

(10) Patent No.: US 6,743,850 B2
(45) Date of Patent: Jun. 1, 2004

(54) CATIONIC POLYMER AND INKJET RECORDING SHEET

(75) Inventors: Kousaku Yoshimura, Shizuoka-ken (JP); Ryoichi Nakano, Shizuoka-ken (JP); Shigetomo Tsujihata, Shizuoka-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/278,997

(22) Filed: Oct. 24, 2002

(65) Prior Publication Data

US 2003/0118791 A1 Jun. 26, 2003

(30) Foreign Application Priority Data

Oct. 26, 2001 (JP) .......................... 2001-329800
Apr. 25, 2002 (JP) .......................... 2002-123455

(51) Int. Cl.$^7$ .............................. C08L 51/00
(52) U.S. Cl. ................ 524/538; 524/516; 524/523; 428/311.71; 428/447; 428/511; 526/279; 526/286; 526/310; 526/312
(58) Field of Search ............... 526/279, 286, 526/310, 312; 428/311.71, 447, 511; 524/516, 523, 538

(56) References Cited

U.S. PATENT DOCUMENTS

| | | | |
|---|---|---|---|
| 4,002,594 A | * 1/1977 | Fetterman | ............ 260/42.37 |
| 4,543,403 A | 9/1985 | Isayama et al. | |
| 5,306,765 A | 4/1994 | Kuriyama et al. | |

FOREIGN PATENT DOCUMENTS

| | | | |
|---|---|---|---|
| EP | 0 835 888 A | 4/1998 | |
| EP | 0 970 819 A | 1/2000 | |
| EP | 0 983 867 A | 3/2000 | |
| JP | 10-195276 | * 7/1998 | |
| JP | 11-58942 | * 3/1999 | |
| JP | 11-058942 | * 3/1999 | |
| JP | 2000-247021 | * 9/2000 | |
| JP | 2000-313847 | * 11/2000 | |
| JP | 2001-199153 | * 7/2001 | |
| JP | 2001293948 A | 10/2001 | |
| WO | WO 01/05599 A | 1/2001 | |
| WO | WO 02/094573 A | 11/2002 | |

OTHER PUBLICATIONS

Partial European Search Report of EP 02 02 3787 Feb. 24, 2003.
Patent Abstracts of Japan, abstracting JP–A–2001–010209, Jan. 16, 2001.

* cited by examiner

*Primary Examiner*—Helen L Pezzuto
(74) *Attorney, Agent, or Firm*—Sughrue Mion, PLLC

(57) ABSTRACT

Provided are a new cationic polymer and an inkjet recording sheet exhibiting a superior printing density of an image without lowering ink receptivity. A cationic polymer represented by the following general formula (A):

General formula (A)

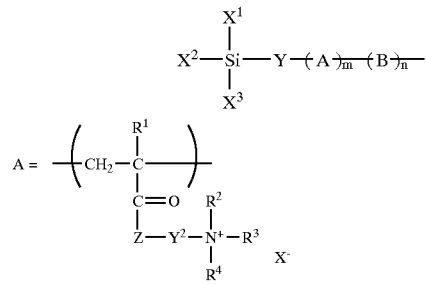

An inkjet recording sheet, that has, on a substrate, a colorant-accepting layer containing cationic polymer modified inorganic pigment particles, which are obtained by bonding inorganic pigment particles to a cationic polymer having, at its terminal, a group that can be bonded to the inorganic pigment particles.

18 Claims, No Drawings

CATIONIC POLYMER AND INKJET RECORDING SHEET

BACKGROUND OF THE INVENTION

1. Field of the Invention

The present invention relates to a new cationic polymer, and a recording material suitable for inkjet recording using a liquid ink such as an aqueous ink, an oil-based ink, or a solid ink which is in a solid state at ambient temperature and is melted and liquefied to be supplied for printing. Specifically, the invention relates to a cationic polymer which can easily be reacted with inorganic pigment particles, and an inkjet recording sheet with superior ink receptivity.

2. Description of the Related Art

In recent years, with the rapid development of the information industry, various information-processing systems have been developed. Recording methods and devices suitable for the information systems have also been developed, and have been put to practical use.

The inkjet recording method, among the above-mentioned recording methods, has come to be widely used not only for office use but also for home use, for the following reasons: recording onto various recording materials is possible; the hardware is relatively inexpensive and compact; the recording is not noisy, and so on.

With the recent improvement in the resolution of inkjet printers, high quality photograph-like recordings have been made possible. Furthermore, with the development of hardware, various recording sheets for inkjet recording have also been developed.

In general, inkjet recording sheets require the following characteristcs: (1) an instantly drying property (the sheet should posses a fast ink-absorbing rate); (2) proper and even ink dot diameter (ink does not bleed on the sheet); (3) good granularity; (4) high degree of ink dot roundness; (5) high color density of ink; (6) high chroma of ink high (the ink is note dulled); (7) good light resistance and water resistance of portions to be printed; (8) high whiteness; (9) good storability (the sheet is not yellowed or colored with long-term storage); (10) superior in dimensional stability and not easily deformed (curling is minimized); and (11) good traveling performance of the sheet in hardware. Furthermore for photo glossy paper used to obtain high quality photograph like recordings, in addition to the above-mentioned characteristics, the sheet should also possess glossiness, surface smoothness, good texture similar to silver salt photographs, and so on.

In order to improve these characteristics, inkjet recording sheets that possess a colorant-accepting layer having a porous structure and a superior ink-absorbing ability (instant drying) and glossiness have been developed and put into practical use.

Japanese Patent Application Laid-Open (JP-A) No. 62-178384 and Japanese Patent Application Publication (JP-B) No. 3-24905 disclose recording materials having a colorant-accepting layer containing silica particles subjected to surface-treatment with a silane coupling agent. The surface activity of the silica particles drops so that the weather resistance of the sheet is improved; however, cohesive force between the silica particles also drops so that the coating film strength of the colorant-accepting layer is weakened.

When a solution wherein the silica is dispersed is mixed with a binder such as PVA, the silica-dispersed solution condenses so that the viscosity of the solution increases, worsening the stability thereof. Therefore, the particle size of the silica particles dispersed in the solution enlarges and negatively affects the glossiness, coating film strength, ink-absorbancy, water resistance, printing density, and so on. Printing density is particularly affected, and greatly decreased.

JP-A No. 2001-10209 discloses an inkjet recording sheet containing inorganic pigment particles, a silane coupling agent having an ammonia structure, and a cationic resin. However, this inkjet recording sheet is obtained by applying the inorganic particles and the cationic resin, in the form of a single solution, onto the surface of a substrate. Thus, condensation is caused between the cationic resin and the inorganic particles having anionic charges. As a result, various performances of the inkjet recording sheet cannot be sufficiently exhibited.

SUMMARY OF THE INVENTION

As described above, under the present circumstances, there has not yet been provided any inkjet recording sheet which is strong because of its colorant-accepting layer wherein no cracks are generated, has a good ink-absorbing ability to make it possible to form a high-resolution image, has such an ink receptivity that the formed image is superior in water resistance and resistance against stain with ink with the passage of time, and further has superior printing density, sharpness and glossiness of the image, The present invention can overcome the above-mentioned problems in the prior art, and attain the following objects.

A first object of the invention is to provide a cationic polymer which is easily reacted with inorganic pigment particles to prevent the condensation thereof.

A second object of the invention is to provide an inkjet recording sheet which can exhibit a high printing density of images.

A third object of the invention is to provide an inkjet recording sheet which is not cracked to be strong, has a good ink-absorbing ability so that a high-resolution image can be formed, has superior glossiness, water resistance and resistance against stain with ink with the passage of time after printing, and exhibits high light resistance even under irradiation with light such as sunlight or fluorescent light.

The invention which can overcome the above-mentioned problems is as follows:

1) A cationic polymer represented by the following general formula (A):

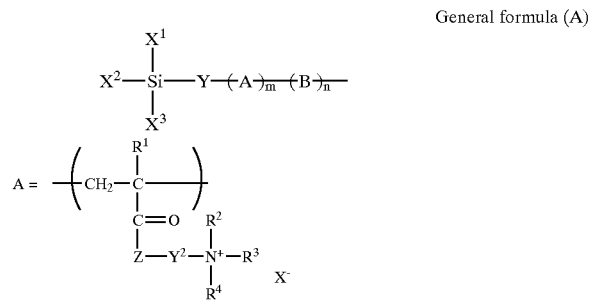

General formula (A)

wherein $X^1$, $X^2$ and $X^3$ each independently represent a hydrogen atom, or an alkyl group having 1 to 18 carbon atoms or an alkoxy group having 1 to 8 carbon atoms or an aryloxy group, each of which may contain a saturated or unsaturated cyclic structure; at least one of $X^1$, $X^2$ and $X^3$ represents the alkoxy group or the aryloxy group; Y represents a bivalent linking group having 1 to 18 carbon atoms, which may have a substituent and may have therein a linking heteroatom; B represents at least one recurring unit which can be copolymerized with A; m and n represent the mole ratios of the A component and the B component, respectively, $0.2 \leq m \leq 1.0$, and $0 \leq n \leq 0.8$ (m+n=1.0); $R^1$ represents a hydrogen atom or an alkyl group having 1 to 4 carbon atoms; $R^2$, $R^3$ and $R^4$ each independently represent a hydrogen atom, or an alkyl group having 1 to 18 carbon atoms, an aryl group or an aralkyl group, each of which may have a substituent and may be linked to form a saturated or unsaturated cyclic structure; Z represents —O— or —NH—; $Y^2$ represents a bivalent linking group having 1 to 8 carbon atoms, which may have therein a linking heteroatom; and $X^-$ represents an anion.

2) An inkjet recording sheet, which having, on a substrate, a colorant-accepting layer containing cationic polymer modified inorganic pigment particles obtained by bonding inorganic pigment particles to a cationic polymer having, at its terminal, a group which can be bonded to the inorganic pigment particles.

3) An inkjet recording sheet, wherein the cationic polymer having, at its terminal, the group which can be bonded to the inorganic pigment particles has the group which can be bonded to the inorganic pigment particles at only the single terminal.

4) An inkjet recording sheet, wherein the group which can be bonded to the inorganic pigment particles is an alkoxysilyl group.

5) An inkjet recording sheet, wherein the cationic polymer having, at its terminal, the group which can be bonded to the inorganic pigment particles is represented by the following general formula (1):

General formula (1)

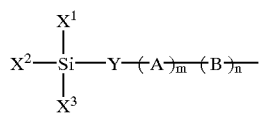

wherein $X^1$, $X^2$ and $X^3$ each independently represent a hydrogen atom, or an alkyl group having 1 to 18 carbon atoms or an alkoxy group having 1 to 8 carbon atoms or an aryloxy group, each of which may contain a saturated or unsaturated cyclic structure; at least one of $X^1$, $X^2$ and $X^3$ represents the alkoxy group or the aryloxy group; Y represents a bivalent linking group having 1 to 18 carbon atoms, which may have a substituent and may have therein a linking heteroatom; A represents at least one recurring unit having a cation; B represents at least one recurring unit which can be copolymerized with A; and m and n represent the mole ratios of the A component and the B component, respectively, $0.2 \leq m \leq 1.0$, and $0 \leq n \leq 0.8$ (m+n=1.0).

6) An inkjet recording sheet, wherein the recurring unit A in the general formula (1) is at least one selected from the following recurring units (I) to (IV):

(I) a recurring unit represented by the following general formula (2):

General formula (2)

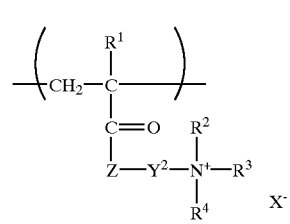

wherein $R^1$ represents a hydrogen atom or an alkyl group having 1 to 4 carbon atoms; $R^2$, $R^3$ and $R^4$ each independently represent a hydrogen atom, or an alkyl group having 1 to 18 carbon atoms, an aryl group or an aralkyl group, each of which may have a substituent and may be linked to form a saturated or unsaturated cyclic structure; Z represents —O— or —NH—; $Y^2$ represents a bivalent linking group having 1 to 8 carbon atoms, which may have therein a linking heteroatom; and $X^-$ represents an anion, (II) a recurring unit represented by the following general formula (3):

General formula (3)

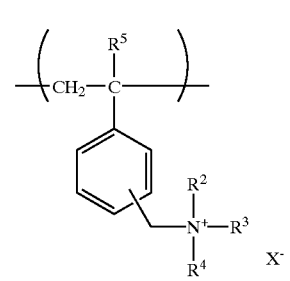

wherein $R^5$ represents a hydrogen atom or a methyl group; and $R^2$, $R^3$, $R^4$ and $X^-$ have the same meanings as in the general formula (2), (III) at least one unit selected from recurring units represented by the following general formulae (4) and (5):

General formula (4)

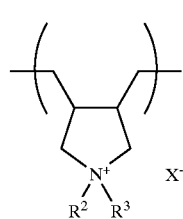

General formula (5)

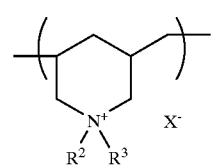

wherein $R^2$, $R^3$ and $X^-$ have the same meanings as in the general formula (2), and (IV) at least one unit selected from recurring units represented by the following general formulae (6) and (7):

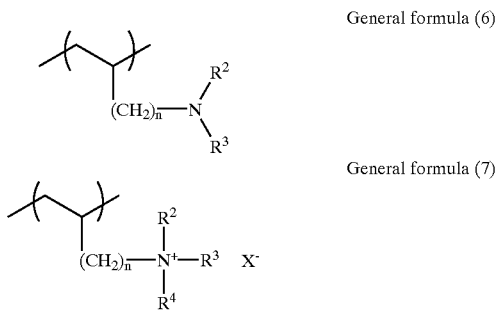

General formula (6)

General formula (7)

wherein n is 0 or 1; and $R^2$, $R^3$, $R^4$ and $X^-$ have the same meanings as in the general formula (2).

7) An inkjet recording sheet, wherein the mass ratio of the inorganic pigment particles (x) to the cationic polymer (y) having, at its terminal, the group which can be bonded to the inorganic pigment particles (x:y) ranges from 1:0.001 to 1:0.2.

8) An inkjet recording sheet, wherein the kind of the inorganic pigment particles is one or more selected from kinds of silica particles, colloidal silica, alumina particles and pseudo-boehmite.

9) An inkjet recording sheet, wherein the colorant-accepting layer further contains a water-soluble resin.

10) An inkjet recording sheet, wherein the water-soluble resin is one or more selected from polyvinyl alcohol resins, cellulose resins, resins having an ether bond, resins having a carbamoyl group, resins having a carboxyl group, and gelatins.

11) An inkjet recording sheet, wherein the colorant-accepting layer further contains a crosslinking agent capable of crosslinking the water-soluble resin.

12) An inkjet recording sheet, wherein the colorant-accepting layer further contains a mordant.

13) An inkjet recording sheet, wherein the colorant-accepting layer is a layer obtained by crosslinking and curing a coating layer obtained by coating with a coating solution containing at least particles and a water-soluble resin, and the crosslinking and curing are performed by adding the crosslinking agent to the coating solution and/or a basic solution having a pH of 8 or more, and applying the basic solution to the coating layer (1) at the same time of forming the coating layer by coating with the coating solution or (2) in the middle of drying the coating layer formed by coating with the coating solution before the coating layer undergoes falling drying rate.

DESCRIPTION OF THE PREFERRED EMBODIMENTS

Cationic Polymer of the Invention

The cationic polymer of the present invention is represented by the following general formula (A). The use of the cationic polymer of the invention is not particularly limited. Examples thereof include an aqueous dispersing agent for silica particles, a glass surface modifier, and an ingredient of organic or inorganic composite material. Since the cationic polymer of the invention is easily reacted with silica particles or the like, the polymer can be suitably used as a condensation inhibitor for an inkjet recording sheet, which will be described later. The polymer is reacted with inorganic pigment particles contained in a colorant-accepting layer of the inkjet recording sheet, to prevent the condensation thereof and improve the dispersibility thereof, whereby the density of an image printed on the inkjet recording sheet can be improved.

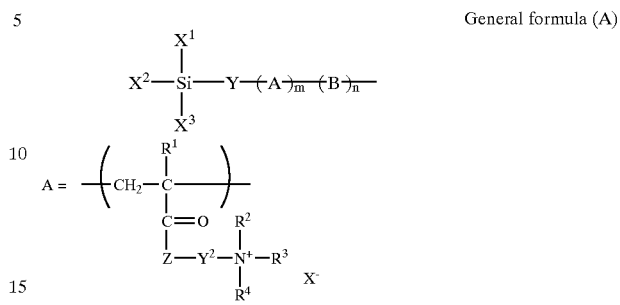

General formula (A)

wherein $X^1$, $X^2$ and $X^3$ each independently represent a hydrogen atom, or an alkyl group having 1 to 18 carbon atoms or an alkoxy group having 1 to 8 carbon atoms or an aryloxy group, each of which may contain a saturated or unsaturated cyclic structure; at least one of $X^1$, $X^2$ and $X^3$ represents the alkoxy group or the aryloxy group; Y represents a bivalent linking group having 1 to 18 carbon atoms, which may have a substituent and may have therein a linking heteroatom; B represents at least one recurring unit which can be copolymerized with A; m and n represent the mole ratios of the A component and the B component, respectively, $0.2 \leq m \leq 1.0$, and $0 \leq n \leq 0.8$ (m+n=1.0); $R^1$ represents a hydrogen atom or an alkyl group having 1 to 4 carbon atoms; $R^2$, $R^3$ and $R^4$ each independently represent a hydrogen atom, or an alkyl group having 1 to 18 carbon atoms, an aryl group or an aralkyl group, each of which may have a substituent and may be linked to form a saturated or unsaturated cyclic structure; Z represents —O— or —NH—; $Y^2$ represents a bivalent linking group having 1 to 8 carbon atoms, which may have therein a linking heteroatom; and $X^-$ represents an anion.

The cationic polymer represented by the general formula (A) is a cationic polymer wherein the recurring unit A of a cationic polymer represented by the general formula (1), which will be illustrated later, is the recurring unit represented by the general formula (2), which will be illustrated later. Accordingly, $X^1$, $X^2$, $X^3$, Y, B, m and n have the same meanings as in the general formula (1), and $R^1$, $R^2$, $R^3$, $R^4$, Z, $Y^2$ and $X^-$ have the same meanings as in the general formula (2). Therefore, these will be referred to in the description on the general formulae (1) and (2).

The number average molecular weight of the cationic polymer of the invention is preferably from 1000 to 100000, more preferably from 1000 to 20000. If this molecular weight is less than 1000 or more than 100000, condensation between the inorganic pigment particles cannot be prevented so that the viscosity of the particle-dispersed solution may become high.

Inkjet Recording Sheet

The inkjet recording sheet of the invention has a colorant-accepting layer containing cationic polymer modified inorganic pigment particles obtained by bonding inorganic pigment particles to a cationic polymer having, at its terminal, a group which can be bonded to the inorganic pigment particles, which may be referred to as the "cationic polymer in the invention" hereinafter). In the case that the colorant-accepting layer is formed, by adding the cationic polymer in the invention to an inorganic pigment dispersed solution at the time of dispersing the inorganic pigment, the cationic polymer and the inorganic pigment particles are reacted to prepare cationic polymer modified inorganic pigment particles and further the condensation thereof, for example, the condensation thereof when the particles are mixed with a water-soluble resin such as polyvinyl alcohol, which will be described later, can be prevented. As a result, a coating solution having a low viscosity and a small dispersed particle size can be prepared. When the resultant coating solution is used, various performances of the inkjet recording sheet can be improved, examples of which include glossiness, resistance against the generation of cracks in the colorant-accepting layer, ink-absorbing rate, water resistance, and resistance against stain with ink with the passage of time. An inkjet recording sheet exhibiting a particularly high printing density can be provided.

In the case that the cationic polymer modified inorganic pigment particles are used to disperse the inorganic pigment particles, addition of a smaller amount thereof can cause an improvement in printing density than in the case that a mere known cationic polymer is used to disperse the particles. It is therefore possible to prevent the coloration of the colorant-accepting layer, a drop in light resistance and the film strength of this layer, and the generation of stain with ink with the passage of time, which are caused when a large amount of a known cationic polymer is used.

Colorant-accepting Layer

First, materials contained in the colorant-accepting layer will be described. The colorant-accepting layer in the invention contains at least the cationic polymer modified inorganic pigment particles, preferably contains a water-soluble resin, a crosslinking agent capable of crosslinking the water-soluble resin, and an organic mordant, and optionally contains various additives.

Cationic Polymer Modified Inorganic Pigment Particles

The cationic polymer modified inorganic pigment particles in the invention can be obtained by bonding inorganic pigment particles to the cationic polymer in the invention.

Cationic Polymer in the Invention

The cationic polymer in the invention has, at its terminal, a group which can be bonded to inorganic pigment particles. It is sufficient that the cationic polymer in the invention has, at its single terminal, the group which can be bonded to inorganic pigment particles. The cationic polymer may have the groups at its both terminals. In order to improve the dispersibility and the fluidity of inorganic pigment particles, it is preferred that the cationic polymer has the group at its single terminal. The kind of the "group which can be bonded to inorganic pigment particles" is not particularly limited. Examples thereof include alkoxysilyl, halogenated silyl, epoxy, isocyanate, acid halide, and acid anhydride groups. Alkoxysilyl, epoxy, isocyanate, and acid halide groups are preferred. From the viewpoint of stability in water and reactivity with inorganic pigment particles, alkoxysilyl is particularly preferred.

As the cationic polymer in the invention, a polymer represented by the following general formula (1) is particularly preferred:

General formula (1)

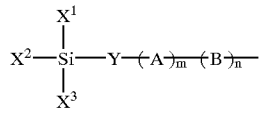

wherein $X^1$, $X^2$ and $X^3$ each independently represent a hydrogen atom, or an alkyl group having 1 to 18 carbon atoms or an alkoxy group having 1 to 8 carbon atoms or an aryloxy group, each of which may contain a saturated or unsaturated cyclic structure; at least one of $X^1$, $X^2$ and $X^3$ represents the alkoxy group or the aryloxy group; Y represents a bivalent linking group having 1 to 18 carbon atoms, which may have a substituent and may have therein a linking heteroatom; A represents at least one recurring unit having a cation; B represents at least one recurring unit which can be copolymerized with A; the copolymer of A and b may be any one of random, alternative, block and graft copolymers of A and B; and m and n represent the mole ratios of the A component and the B component, respectively, $0.2 \leq m \leq 1.0$, and $0 \leq n \leq 0.8$ (m+n=1.0).

In the general formula (1), $X^1$, $X^2$ and $X^3$ each independently represent a hydrogen atom, or an alkyl group having 1 to 18 carbon atoms or an alkoxy group having 1 to 8 carbon atoms or an aryloxy group. The alkyl, alkoxy and aryloxy groups may have a saturated or unsaturated cyclic structure. At least one of $X^1$, $X^2$ and $X^3$ represents the alkoxy group or the aryloxy group.

The carbon number of the alkyl group is from 1 to 18, preferably from 1 to 8. If the carbon number is more than 18, the reactivity with inorganic pigment particles falls so that condensation may not be prevented. Examples of the alkyl group include methyl, ethyl, propyl, butyl, hexyl, octyl, decyl, dodecyl, tetradecyl, and octadecyl groups. Methyl, ethyl, propyl, and butyl groups are preferred.

The carbon number of the alkoxy group is from 1 to 8, preferably from 1 to 4. If the carbon number is more than 8, the reactivity with inorganic pigment particles falls so that condensation may not be prevented. Examples of the alkoxyl group include methoxy, ethoxy, propoxy, butoxy, hexyloxy, and octyloxy groups. Methoxy, ethoxy, and propoxy groups are preferred.

The carbon number of the aryloxy group is preferably from 6 to 14, more preferably 6 to 10. Examples of the aryloxy group include phenoxy, methylphenoxy, nitrophenoxy, methoxyphenoxy, and naphthoxy groups. Phenoxy, and nitrophenoxy groups are preferred.

In the general formula (1), Y represents a bivalent linking group having 1 to 18 carbon atoms, which may have a substituent and may have therein a linking heteroatom. The total carbon number of Y is preferably from 2 to 8. If the total carbon number is more than 18, the solubility in water or alcoholic solvents falls so that sufficient performance may not be obtained. Examples of the substituent include a halogen atom, a hydroxyl group, an amino group, an ester group, an ether group, and an amino group. Examples of the heteroatom include oxygen, nitrogen, sulfur, silicon and phosphorus atoms. Oxygen, nitrogen and sulfur atoms are preferred.

Specific preferred examples of the bivalent linking group include methylene, ethylene, propylene, tetramethylene, hexamethylene, xylylene, and 3-oxapentamethylene.

In the general formula (1), A represents at least one recurring unit having a cation. The kind of A is not particularly limited. Recurring units represented by the following formulae (I) to (IV) are particularly preferred. (I) a recurring unit represented by the following general formula (2):

General formula (2)

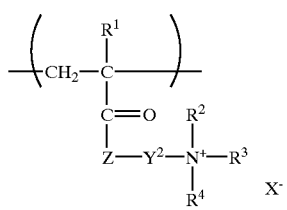

wherein R¹ represents a hydrogen atom or an alkyl group having 1 to 4 carbon atoms; R², R³ and R⁴ each independently represent a hydrogen atom, or an alkyl group having 1 to 18 carbon atoms, an aryl group or an aralkyl group, each of which may have a substituent and may be linked to form a saturated or unsaturated cyclic structure; Z represents —O— or —NH—; Y² represents a bivalent linking group having 1 to 8 carbon atoms, which may have therein a linking heteroatom; and X⁻ represents an anion.

The cationic polymer of the invention, represented by the general formula (A), is a cationic polymer represented by the general formula (1) having a recurring unit wherein A is represented by the general formula (2).

In the general formula (2), $R^1$ represents a hydrogen atom or an alkyl group having 1 to 4 carbon atoms. The carbon number of the alkyl group is preferably 1 or 2. If the carbon number is more than 4, a polymer cannot be easily obtained on occasion. Examples of the alkyl group include methyl, ethyl, propyl, i-butyl and n-butyl groups. As $R^1$, a hydrogen atom and a methyl group are preferred.

In the general formula (2), $R^2$, $R^3$ and $R^4$ each independently represent a hydrogen atom, or an alkyl group having 1 to 18 carbon atoms, an aryl group or an aralkyl group. The alkyl, aryl or aralkyl group may have a substituent. Examples of the substituent are the same as described above.

The carbon number of the alkyl group is from 1 to 18, preferably from 1 to 8. If the carbon number is more than 18, the solubility in water or alcoholic solvents falls so that sufficient performance may not be obtained. Examples of the alkyl group include methyl, ethyl, propyl, butyl, hexyl, cyclohexyl, octyl, decyl, dodecyl, tetradecyl, and octadecyl groups. Methyl, ethyl, butyl, hexyl and cyclohexyl groups are preferred.

The carbon number of the aryl group is preferably from 6 to 14, more preferably from 6 to 10. Examples of the aryl group include phenyl, tolyl, xylyl and naphthyl groups. Phenyl and tolyl groups are preferred.

The carbon number of the aralkyl group is preferably from 7 to 15, more preferably from 7 to 11. Examples of the aralkyl group include benzyl, phenethyl, diphenylmethyl, triphenylmethyl, and α- or β-styryl groups. A benzyl group is preferred.

In the general formula (2), Z represents —O— or —NH—.

In the general formula (2), $Y^2$ represents a bivalent linking group having 1 to 8 carbon atoms, which may have therein a linking heteroatom. Examples of the heteroatom are the same as described above. The total number of $Y^2$ is preferably from 2 to 6. If the total number is more than 8, the solubility in water or alcoholic solvents falls so that sufficient performace may not be obtained. Examples of the bivalent linking group include methylene, ethylene, propylene, tetramethylene, hexamethylene, xylylene, and 3-oxapentamethylene.

In the general formula (2), X⁻ represents an anion. The kind of the anion is not particularly limited. Examples thereof include $F^-$, $Cl^-$, $Br^-$, $AcO^-$, $NO_3^-$, $SO_4^{2-}$, $HSO_4^-$, $MeSO_4^-$, $PO_4^{3-}$, $HPO_4^{2-}$, $H_2PO_4^-$, $TsO^-$, $CH_3SO_3^-$, $ClO_4^-$, $BF_4^-$, $PF_6^-$, $CH_3CH_2CO_2^-$, $Ph-CO_2^-$, $(CO_2)_2^{2-}$, and (meth)acrylate anion.

Specific examples of the recurring unit represented by the general formula (2) are illustrated below. In the invention, however, the recurring unit is not limited to these examples.

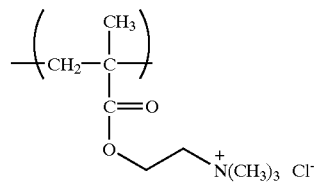

I-1

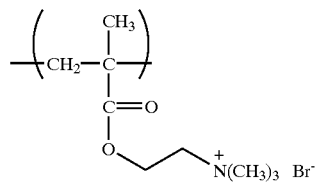

I-2

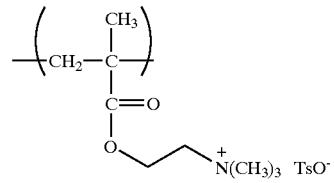

I-3

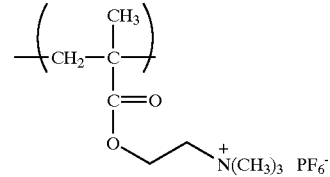

I-4

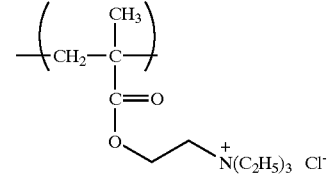

I-5

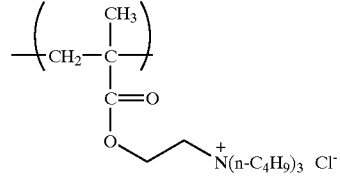

I-6

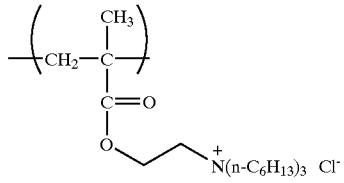

I-7

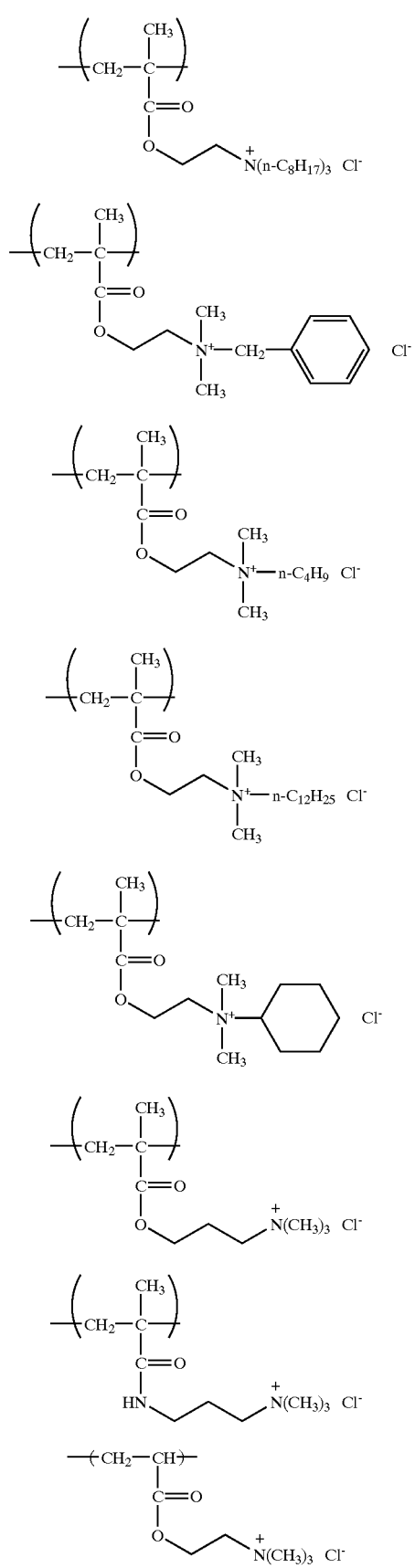
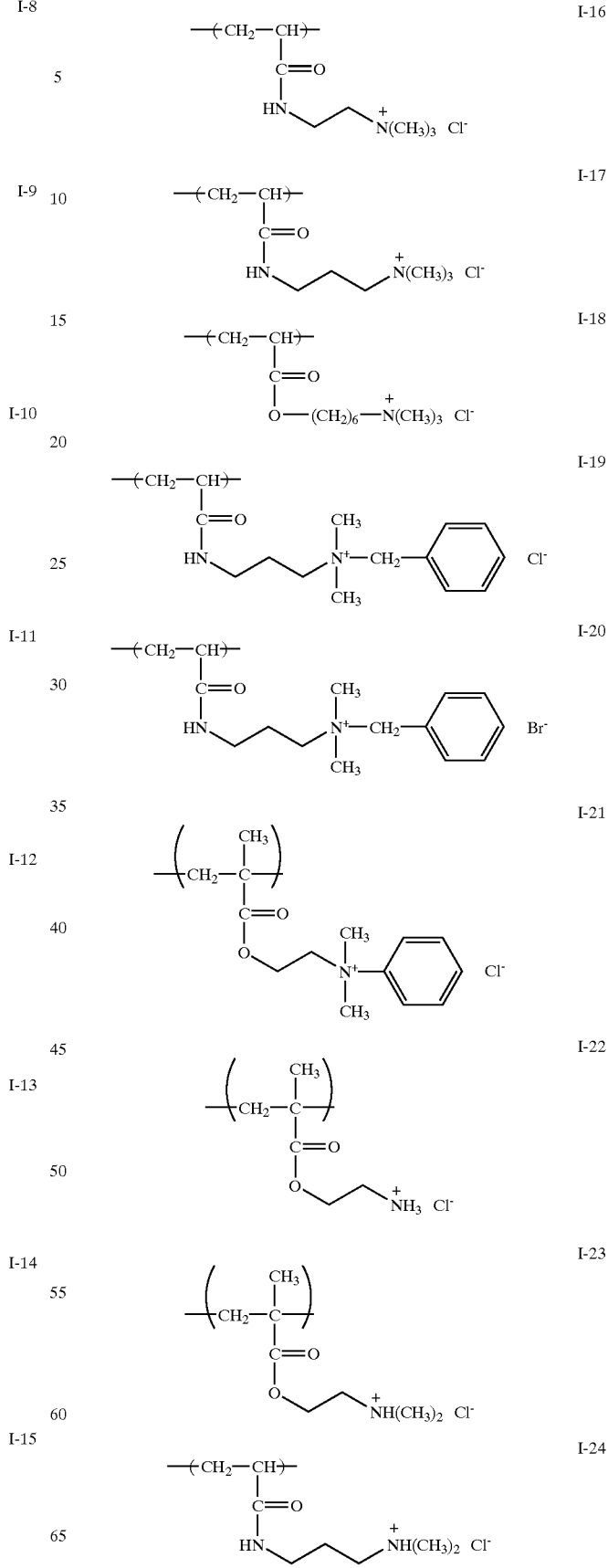

-continued

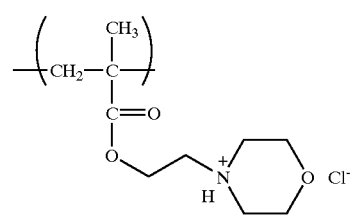
I-25

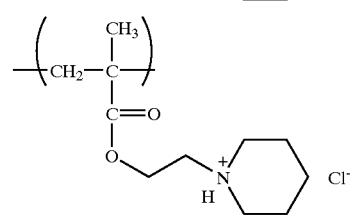
I-26

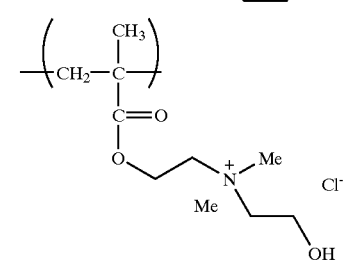
I-27

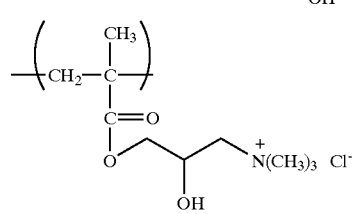
I-28

(II) a recurring unit represented by the following general formula (3):

General formula (3)

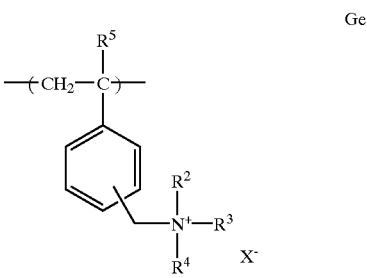

In the general formula (3), $R^5$ represents a hydrogen atom or a methyl group; and $R^2$, $R^3$, $R^4$ and $X^-$ have the same meanings as in the general formula (2).

Specific examples of the recurring unit represented by the general formula (3) are illustrated below. In the invention, however, the recurring unit is not limited to these examples.

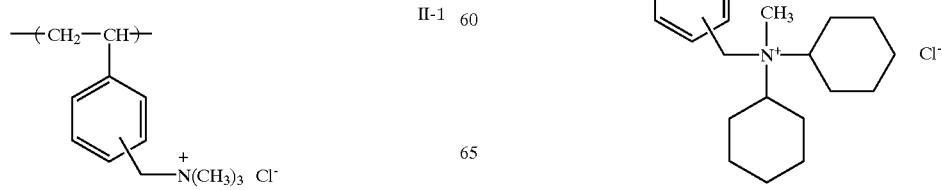
II-1

-continued

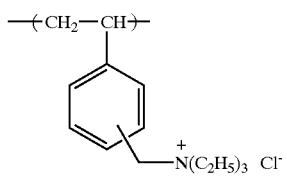
II-2

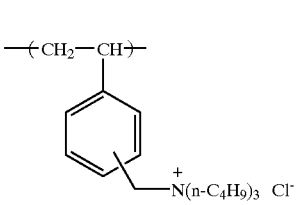
II-3

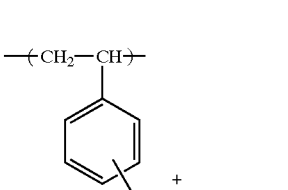
II-4

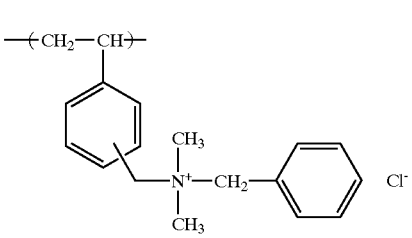
II-5

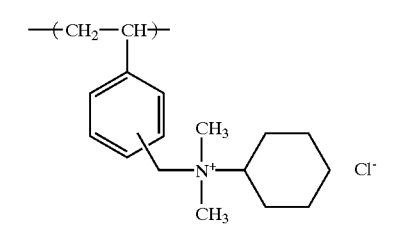
II-6

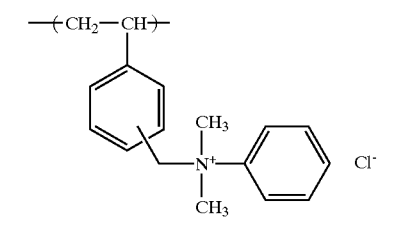
II-7

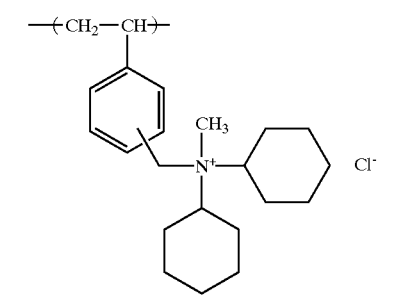
II-8

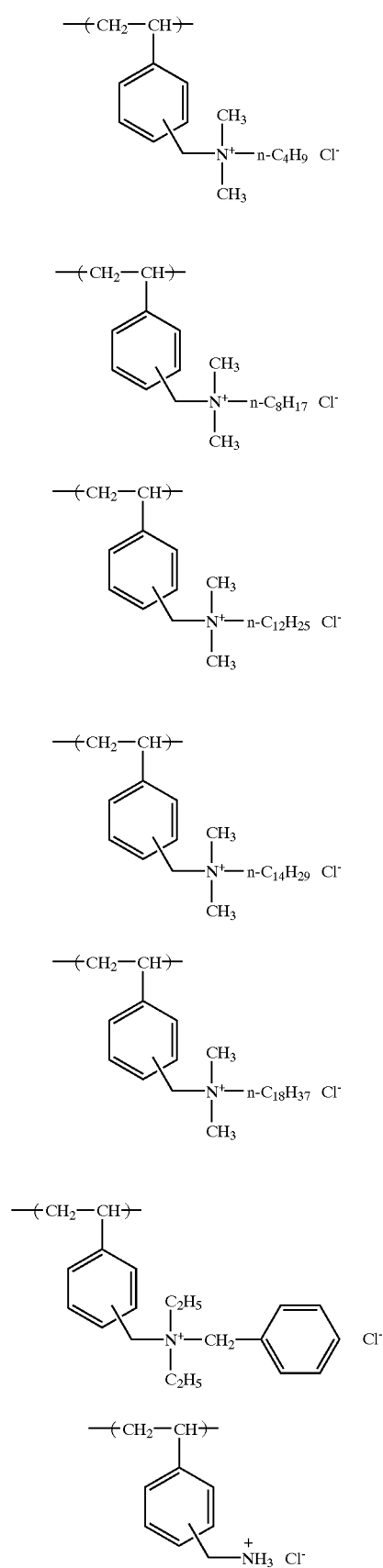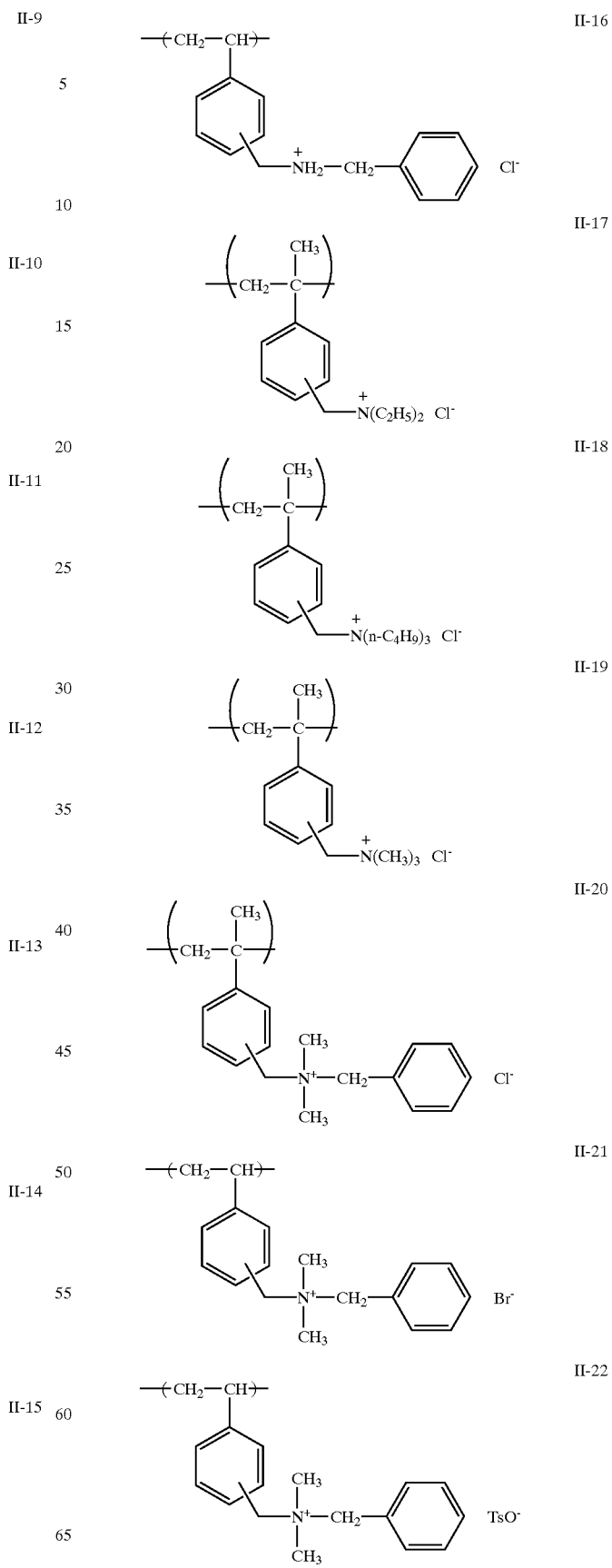

-continued

II-23
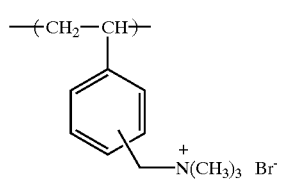

II-24
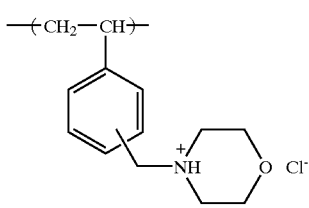

II-25
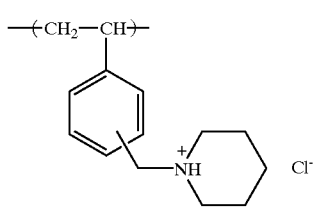

(III) at least one unit selected from recurring units represented by the following general formulae (4) and (5):

General formula (4)
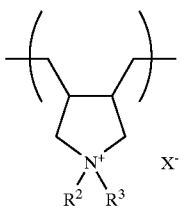

General formula (5)
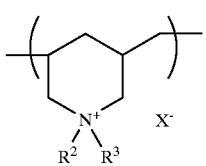

In general formulae (4) and (5), $R^2$, $R^3$ and $X^-$ have the same meanings as in the general formula (2).

Specific examples of the recurring units represented by the general formulae (4) and (5) are illustrated below. In the invention, however, the recurring unit is not limited to these examples.

III-1a
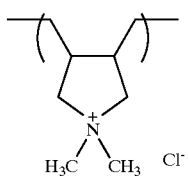

-continued

III-1b
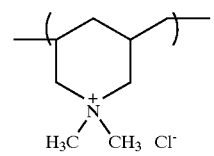

III-2a
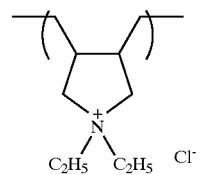

III-2b
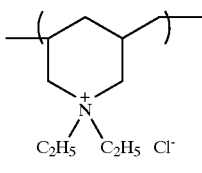

III-3a
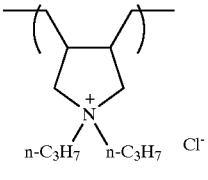

III-3b
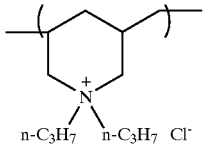

III-4a
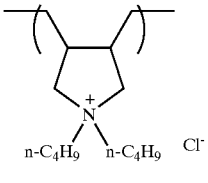

III-4b
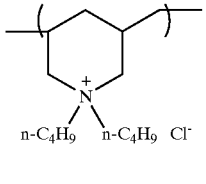

III-5a
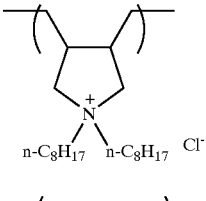

III-5b
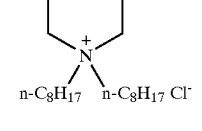

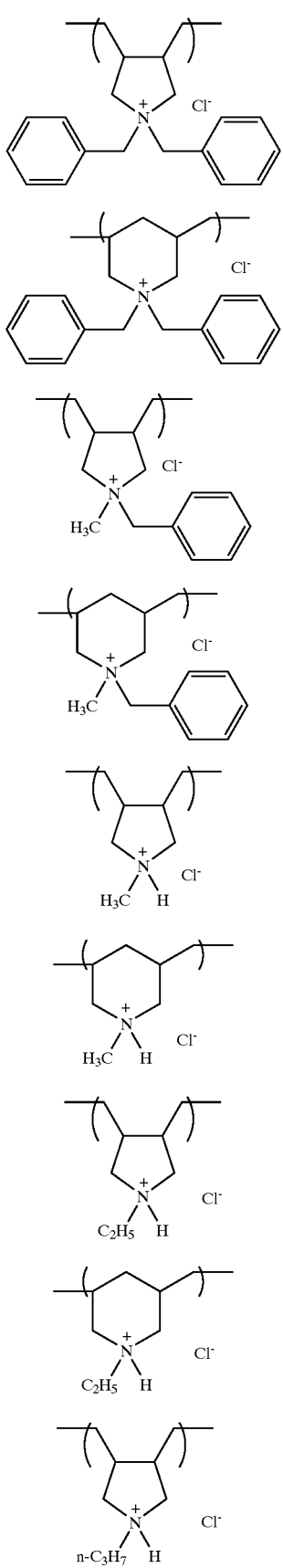
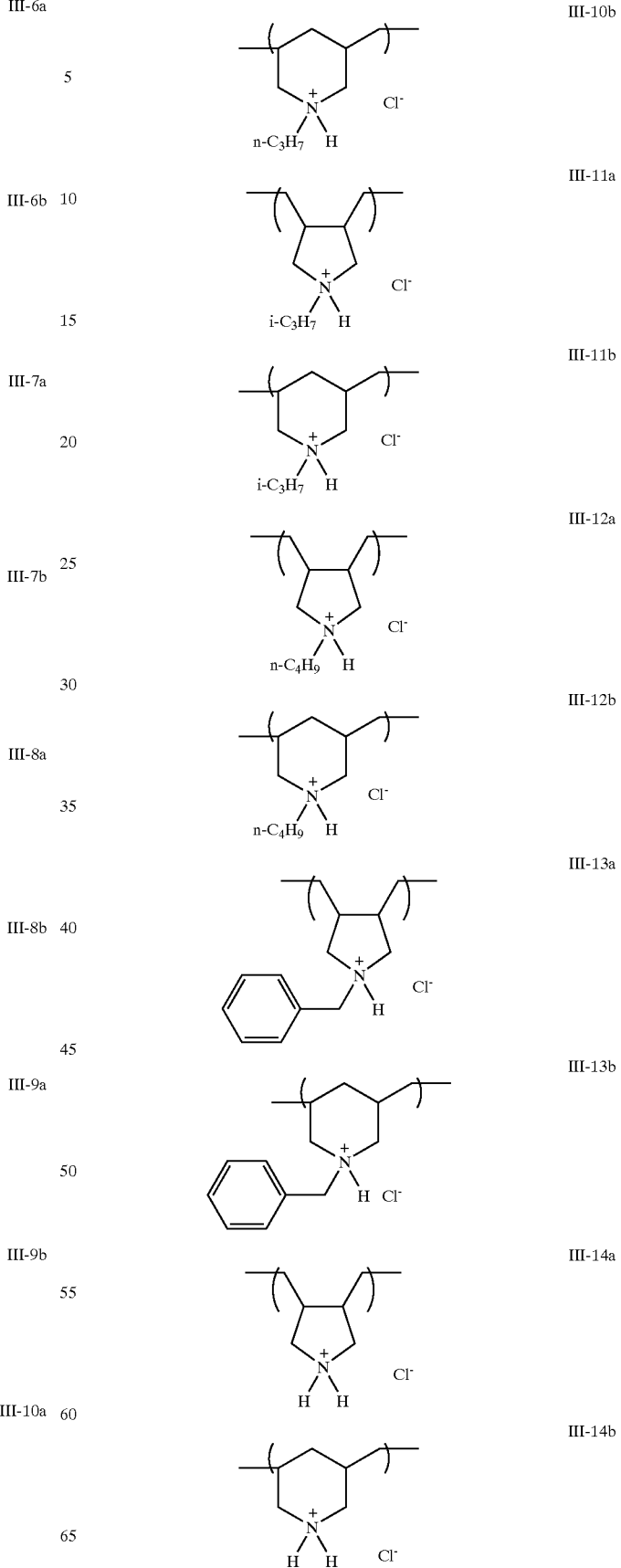

-continued

III-15a 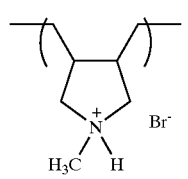

III-15b 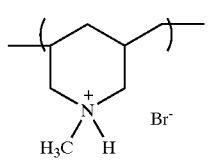

III-16a 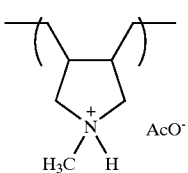

III-16b 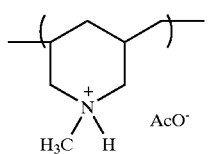

III-17a 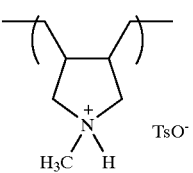

III-17b 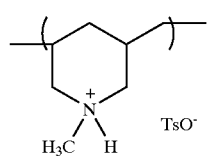

III-18a 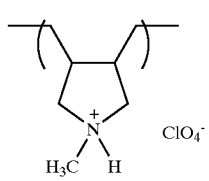

III-18b 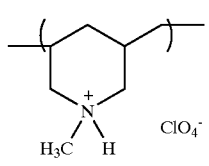

III-19a 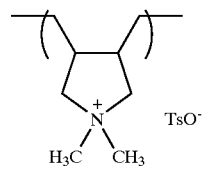

-continued

III-19b 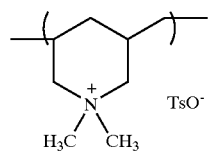

III-20a 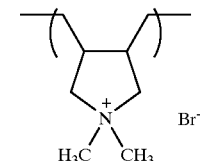

III-20b 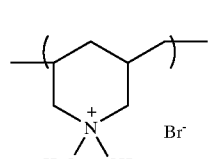

(IV) at least one unit selected from recurring units represented by the following general formulae (6) and (7):

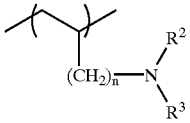
General formula (6)

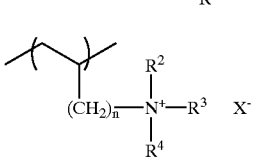
General formula (7)

In general formulae (6) and (7), n is 0 or 1; and $R^2$, $R^3$, $R^4$ and $X^-$ have the same meanings as in the general formula (2).

Specific examples of the recurring units represented by the general formulae (6) and (7) are illustrated below. In the invention, however, the recurring unit is not limited to these examples.

IV-1 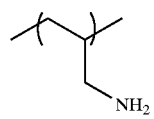

IV-2 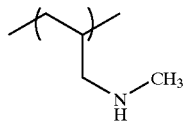

IV-3 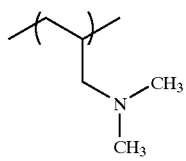

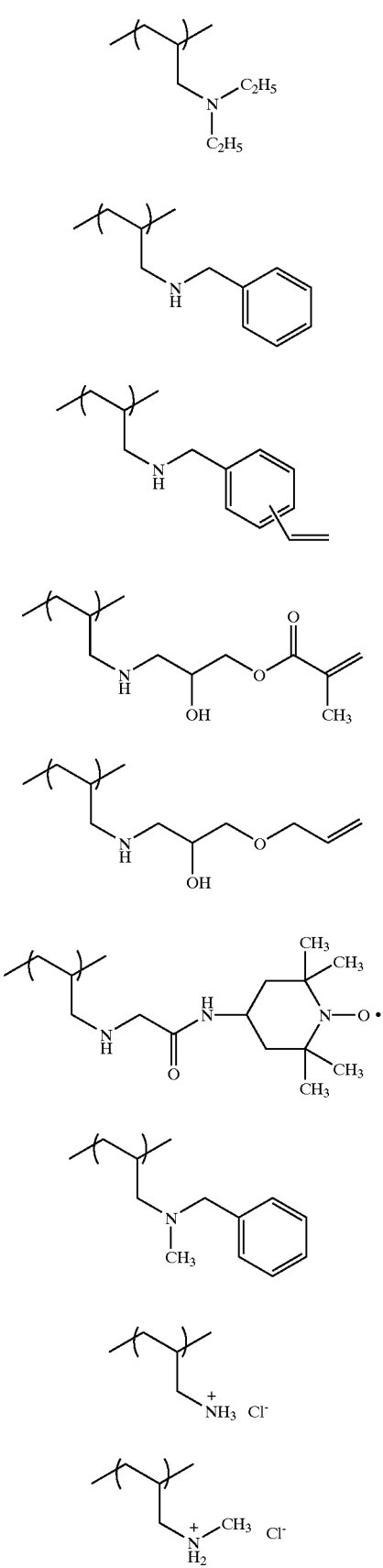

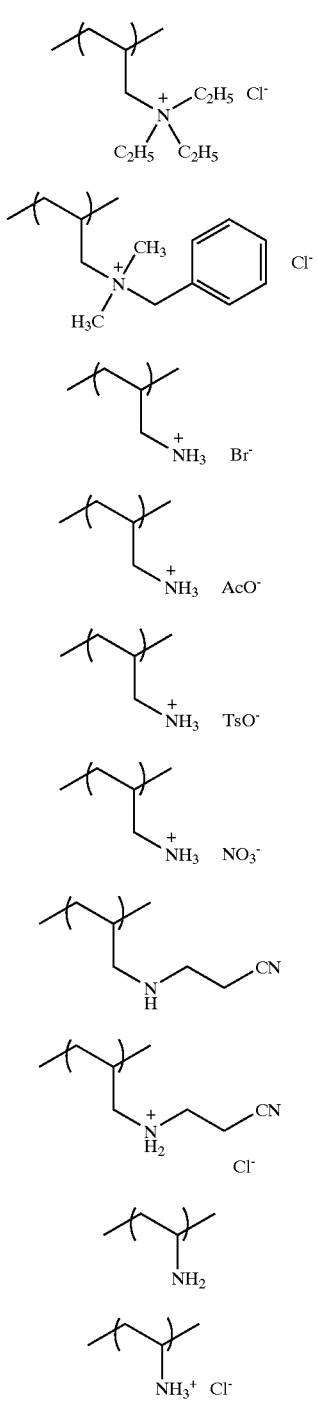

acrylate, dimethylaminoethyl (meth)acrylate, dimethylaminopropyl (meth)acrylate), alkyl (meth)acrylamide (such as (meth)acrylamide, dimethyl (meth)acrylamide, N-isopropyl (meth)acrylamide, n-butyl (meth)acrylamide, tert-butyl (meth)acrylamide, and tert-octyl (meth)acrylamide), substituted-alkyl (meth)acrylamide (such as dimethylaminoethyl (meth)acrylamide and dimethylaminopropyl (meth)acrylamide), vinyl cyanide (such as (meth)acrylonitrile, and α-chloroacrylonitrile), carboxylic acid vinyl esters (such as vinyl acetate, vinyl benzoate and vinyl formate), aliphatic conjugated dienes (such as 1,3-butadiene and isoprene), and polymerizable oligomers (such as single terminal methacryloylated polymethyl methacrylate oligomers, single terminal methacryloylated polystyrene oligomers, and single terminal methacryloylated polyethylene glycol).

In the general formula (1), m and n represent the mole ratios of the A component and the B component, respectively, $0.2 \leq m \leq 1.0$, and $0 \leq n \leq 0.8$ provided that $m+n=1.0$. m:n is preferably from 0.4:0.6 to 1.0:0, preferably from 0.5:0.5 to 1.0:0.

The number average molecular weight of the cationic polymer in the invention is preferably from 1000 to 100000, more preferably from 1000 to 20000, and most preferably from 500 to 10000. If this molecular weight is less than 1000 or more than 100000, condensation between the inorganic pigment particles may not be prevented.

Specific examples of the above-mentioned cationic polymer are illustrated below (cationic polymers 1 to 27). In the invention, however, the cationic polymer is not limited to these examples.

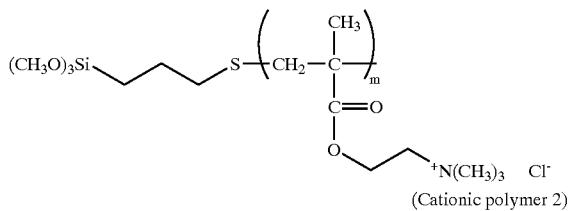
(Cationic polymer 1)

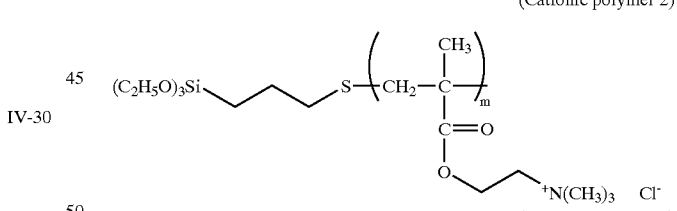
(Cationic polymer 2)

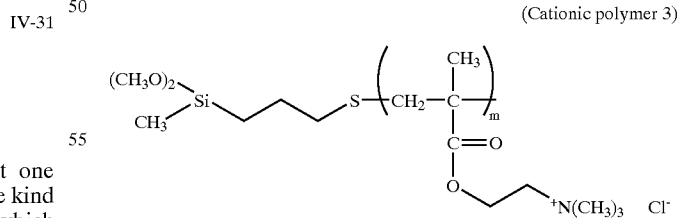
(Cationic polymer 3)

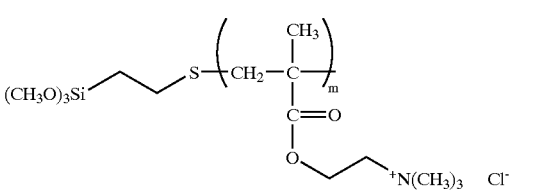
(Cationic polymer 4)

In the general formula (1), B represents at least one recurring unit which can be copolymerized with A. The kind of B is not particularly limited if it is a recurring unit which can be copolymerized with A. Examples thereof include aromatic vinyl compounds (such as styrene, α-methylstyrene, p-hydroxystyrene, chloromethylstyrene and vinyltoluene), (meth)acrylic acid alkyl esters (such as methyl (meth)acrylate, ethyl (meth)acrylate, n-butyl (meth)acrylate, i-butyl (meth)acrylate, and 2-ethylhexyl (meth)acrylate), (meth)acrylic acid alkylaryl esters (such as benzyl (meth)acrylate), (meth)acrylic acid substituted-alkyl esters (such as glycidyl (meth)acrylate, 2-hydroxyethyl (meth)

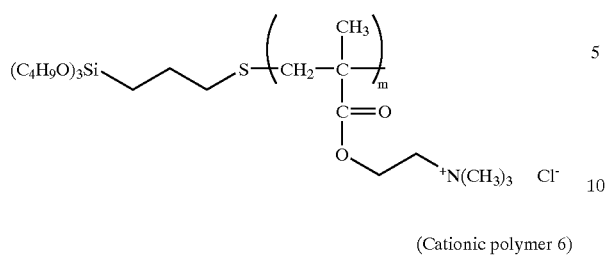
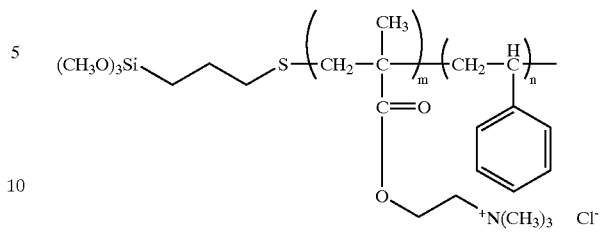

(Cationic polymer 18)

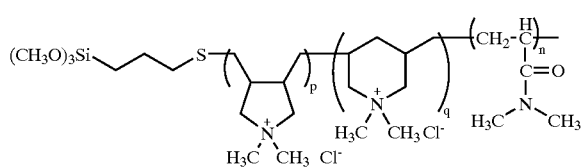

(Cationic polymer 19)

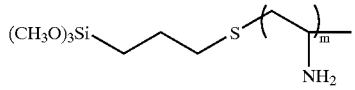

(Cationic polymer 20)

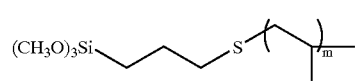

(Cationic polymer 21)

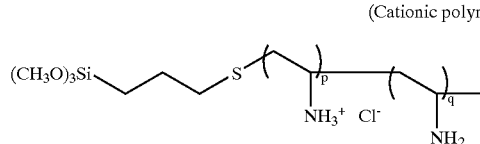

(Cationic polymer 22)

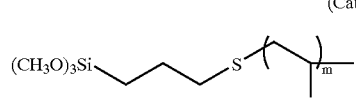

(Cationic polymer 23)

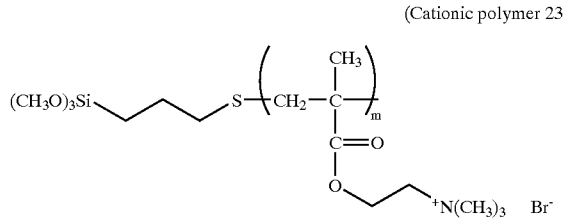

(Cationic polymer 24)

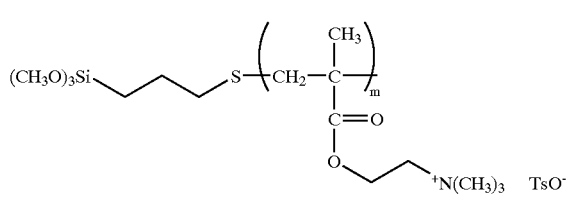

(Cationic polymer 25)

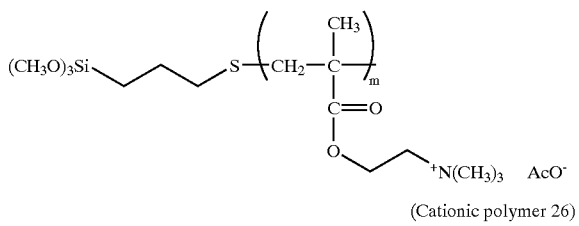

(Cationic polymer 26)

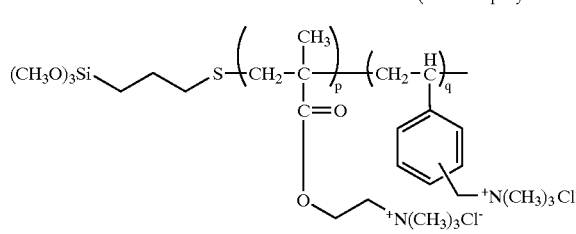

(Cationic polymer 27)

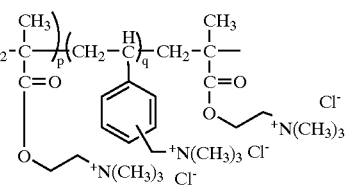

Inorganic Pigment Particles

Examples of the inorganic pigment particles include silica, colloidal silica, titanium dioxide, barium sulfate, calcium silicate, zeolite, kaolinite, halloysite, mica, talc, calcium carbonate, magnesium carbonate, calcium sulfate, boehmite, and pseudo-boehmite particles. Silica and pseudo-boehmite particles are particularly preferred.

The silica particles have characteristics that their ink-absorbing ability and ink-holding ability are high because of a particularly large specific surface area and that if the particles are dispersed up to an appropriate particle size, transparency can be given to the colorant-accepting layer because of a low refractive index so that a high color density and a good color-developability can be obtained. The transparency of the colorant-accepting layer is important for articles for which transparency is required, such as an OHP. The transparency is also important for recording sheets such as photo glossy paper in order to obtain a high color density and a good color-developability.

The average primary particle size of the inorganic pigment particles is preferably 20 nm or less, more preferably 10 nm or less, and particularly preferably 3 to 10 nm.

The silica particles have, on their surfaces, silanol groups. Since the particles adhere easily to each other by hydrogen bonds based on the silanol groups, a structure having a large porosity can be formed when the average primary particle size is 10 nm or less as described above, whereby the ink-absorbing ability can be effectively improved.

The silica particles can be roughly classified into wet-process particles and dry-process particles, dependently on the production process thereof.

The main current of the wet process is a method of discomposing a silicate salt with an acid to generate active silica, and polymerizing, condensing and precipitating the active silica moderately to yield water-containing silica. On the other hand, the main current of the dry process is a method of hydrolyzing silicon halide in a high-temperature gas phase (flame hydrolysis process), thereby yielding anhydrous silica, or a method of subjecting silica sand and coke to heating reduction gasification with arc in an electrical furnace, and then oxidizing the resultant (arc process), thereby yielding anhydrous silica.

The water-containing silica and the anhydrous silica obtained by these methods have different natures since they are different in the density of silanol groups in the surface thereof, the point of the presence or absence of voids, and so on. The anhydrous silica (anhydrous silicate) is particularly preferred since it easily makes a three-dimensional structure having a high porosity. The reason for this is unclear but can be presumed as follows. In the case of the water-containing silica, the density of silanol groups in the surfaces of the particles is as large as 5 to 8 per $nm^2$. Thus, the silica particles are apt to aggregate densely. On the other hand, in the case of the anhydrous silica, the density of silanol groups in the surfaces of the particles is as small as 2 to 3 per $nm^2$. Therefore, the silica particles flocculate thinly. As a result, a structure having a high porosity would be generated.

In the invention, therefore, it is preferred to use silica (silica particles) whose surfaces have a silanol group density of 2 to 3 per $nm^2$.

As the inorganic pigment particles, pseudo-boehmite is also preferred. Pseudo-boehmite is a colloidal aggregate of boehmite crystal (composition formula: AlOOH), and pseudo-boehmite containing a binder is preferred. About the pore property thereof, the average pore radius thereof is preferably from 1 to 10 nm, more preferably from 3 to 10 nm. The pore volume thereof preferably ranges from 0.5 to 1.0 ml/g.

The coating amount of the pseudo-boehmite preferably ranges from 5 to 30 $g/m^2$. If the coating amount is less than 5 $g/m^2$, ink-absorbing ability may unfavorably deteriorate or glossiness may deteriorate by effect of unevenness of the substrate. If the coating amount is more than 30 $g/m^2$, pseudo-boehmite is consumed in vain and further the strength of pseudo-boehmite may unfavorably drop.

About the composition of the coating solution of pseudo-boehmite, 5 to 50 part by mass of a binder is preferably contained per 100 part by mass of the solid content of pseudo-boehmite and the solid content concentration in the whole is preferably from 5 to 30% by mass. The solvent for the coating solution is preferably an aqueous solvent from the viewpoint of handling performance. The binders which can be preferably used are organic binders made of a high-molecular compound such as starch or a modified product thereof, polyvinyl alcohol or a modified product thereof, SBR latex, NBR latex, carboxymethylcellulose, hydroxymethylcellulose, or polyvinylpyrrolidone.

The colorant-accepting layer in the invention preferably contains 10% or more by mass of the cationic polymer modified inorganic pigment particles, and more preferably contains 20% or more by mass thereof. If the content by percentage of the cationic polymer modified inorganic pigment particles is within the range, it is unnecessary that all of inorganic pigment particles added to a coating solution for the colorant-accepting layer by the following method react with the cationic polymer.

The cationic polymer modified inorganic pigment particles in the invention can be obtained by adding, to the coating solution for the colorant-accepting layer, inorganic pigment particles and a solution wherein the cationic polymer in the invention is dissolved in a solvent such as methanol, and then stirring the resultant solution. At this time, the ratio of the added amount (x) of the inorganic pigment particles to that (y) of the cationic polymer, that is, the ratio of x:y is preferably from 1:0.001 to 1:0.2, more preferably from 1:0.002 to 1:0.1, and particularly preferably from 1:0.005 to 1:0.5. If the added amount of the cationic polymer in the invention is less than 0.001% by mass of the added amount of the inorganic pigment particles, the inorganic pigment particles may not be prevented from be aggregated. If the added amount is more than 0.2% by mass, the inorganic pigment particles may aggregated or the viscosity of the coating solution may increase to lose coating suitability.

Water-soluble Resin

The colorant-accepting layer in the invention is preferably a layer formed by applying a dispersion solution containing the cationic polymer modified inorganic pigment particles and a water-soluble resin onto a substrate. Examples of the water-soluble resin include resins having a hydroxyl group as a hydrophilic structure unit, such as polyvinyl alcohol (PVA), cation-modified polyvinyl alcohol, anion-modified polyvinyl alcohol, silanol-modified polyvinyl alcohol, polyvinyl acetal, cellulose resins (for example, methylcellulose (MC), ethylcellulose (EC), hydroxyethylcellulose (HEC), and carboxymethylcellulose (CMC)), chitins, chitosans, and starch; resins having an ether bond, such as polyethylene oxide (PEO), polypropylene oxide (PPO), polyethylene glycol (PEG), and polyvinyl ether (PVE); resins having an amide group or an amide bond, such as polyacrylamide (PAAM), and polyvinyl pyrrolidone (PVP); and resins having a carboxylic group as a dissociating group, such as polyacrylic acid salts, maleic acid resin, alginic acid salts, and gelatins.

Among the above-mentioned resins, the polyvinyl alcohols are preferred.

The content by percentage of the water-soluble resin is preferably from 9 to 40% by mass of all solid contents in the colorant-accepting layer, and more preferably from 16 to 33% by mass thereof.

If this content is less than 9% by mass, the film strength of the colorant-accepting layer drops so that the film may easily be cracked when dried. If the content is more than 40% by mass, the voids therein are easily closed by the resin. As a result, the porosity decreases so that the ink-absorbing ability may drop.

Each of the cationic polymer modified inorganic pigment particle and the water-soluble resin that constitute the main portion of the colorant-accepting layer, may be made of a single material or a mixture of materials.

The kind of the resin combined with the inorganic pigment particles is important for transparency. In the case that the above-mentioned anhydrous silica is used, polyvinyl alcohol (PVA) is preferred as the water-soluble resin. PVA having a saponification degree of 70 to 99% is more preferred, and PVA having a saponification degree of 70 to 90% is particularly preferred.

The PVA has hydroxyl groups in the structure unit thereof. The hydroxyl groups and silanol groups on the surfaces of the inorganic pigment particles form hydrogen bonds, so as to make it easy to form a three-dimensional net structure, which has secondary particles of the inorganic pigment particles as chain units. By the formation of this three-dimensional net structure, it can be considered that a colorant-accepting layer having a porous structure having a high porosity can be formed.

In inkjet recording, the thus-obtained porous colorant-accepting layer absorbs ink rapidly by a capillary phenomenon to make it possible to form a completely circular ink spot easily without bleeding.

Content Ratio between the Inorganic Pigment Particles and the Water-soluble Resin The content ratio between the cationic polymer modified inorganic pigment particles (i; in the case that non-reacted or other inorganic pigment particles are contained, i is the total amount of all of the inorganic pigment particles) and the water-soluble resin (p) [PB ratio (i:p), the mass of all of the inorganic pigment particles to 1 part by mass of the water-soluble resin] produces a large effect on the film structure of the colorant-accepting layer. That is, when the PB ratio gets large, the porosity, the pore volume, the surface area (per unit mass) becomes large.

Specifically, the PB ratio (i:p) is preferably from 1.5:1 to 10:1. If the PB ratio is over 10:1, that is, the PB ratio becomes too large, the film strength drops and cracks may easily be generated when the film is dried. If the PB ratio is less than 1.5:1, that is, the PB ratio is too small, voids are easily closed by the resin so that the porosity may decrease and ink-absorbing ability may deteriorate.

In the case that the recording sheet passes through the carrying system of an inkjet printer, stress may be applied to the recording sheet. It is therefore necessary that the colorant-accepting layer has a sufficient film strength. When the colorant-accepting layer is cut into a sheet form, it is also necessary that the colorant-accepting layer has a sufficient film strength in order to prevent cracks or exfoliation of the colorant-accepting layer.

In this case, the PB ratio is preferably 5:1 or less. In order to ensure high-speed ink-absorbing ability in the inkjet printer, the PB is preferably 2:1 or more.

For example, in the case that a coating solution wherein anhydrous silica particles modified with the cationic polymer in the invention and having an average primary particle size of 20 nm or less, and the water-soluble resin are completely dispersed at a PB ratio of 2:1 to 5:1 in aqueous solution is applied to a substrate and the coating layer is dried, a three-dimensional net structure having second particles of the silica particles as a chain unit is formed. Thus, it is possible to form easily a transparent porous film having an average pore diameter of 30 nm or less, a porosity of 50 to 80%, a pore specific volume of 0.5 ml/g or more, and a specific surface of 100 $m^2$/g or more.

Crosslinking Agent

The colorant-accepting layer of the inkjet recording sheet of the invention is preferably a coating layer (porous layer) which contains not only the inorganic pigment particles and the water-soluble resin but also a crosslinking agent capable of crosslinking the water-soluble resin, and which is cured by crosslinking reaction between the crosslinking agent and the water-soluble resin.

Preferably, the supply of the crosslinking agent is performed at the same time of applying the (first) coating solution for forming the porous colorant-accepting layer, or is performed using a second coating solution before the coating layer formed by applying the first coating solution exhibits a falling drying rate. By this operation, cracks generated during the coating layer is dried can be effectively prevented. In other words, the crosslinking agent solution penetrates into the coating layer at the same time when the coating solution is applied or before the coating layer exhibits a falling drying rate, and then reacts rapidly with the water-soluble resin in the coating layer. Thus, the water-soluble resin is gelatinized (or cured), whereby the film strength of the coating film can be instantaneously improved to a great degree. The crosslinking agent may be incorporated in the first and/or second coating solution, or may be supplied by addition of a coating solution different from the first and second coating solutions.

It is advisable that as the crosslinking agent capable of crosslinking the water-soluble resin, a suitable agent is appropriately selected considering relationship with the water-soluble resin used in the colorant-accepting layer. The agent is preferably a boron compound since it exhibits speedy crosslinking reaction. Examples thereof include borax, boric acid, borates (such as ortho borates, $InBO_3$, $ScBO_3$, $YBO_3$, $LaBO_3$, $Mg_3(BO_3)_2$, and $Co_3(BO_3)_2$), diborates (such as $Mg_2B_2O_5$ and $Co_2B_2O_5$), metaborates (such as $LiBO_2$, $Ca(BO_2)_2$, $NaBO_2$, and $KBO_2$), tetraborates (such as $Na_2B_4O_7 \cdot 10H_2O$), and pentaborates (such as $KB_5O_8 \cdot 4H_2O$, $Ca_2B_6O_{11} \cdot 7H_2O$, and $CsB_5O_5$). Other examples thereof include glyoxazal, melamine.formaldehyde (such as methylolmelamine, and alkylated methylolmelamine), methylolurea, resol resin, polyisocyanate, and epoxy resins. Among these examples, borax, boric acid and borates are preferred since they cause crosslinking reaction rapidly. More preferably, they are combined with polyvinyl alcohol as the water-soluble resin and the combination is used.

In the case that gelatin is used as the water-soluble resin, the following compounds, which are known as film hardeners for gelatin, can be used as the crosslinking agent: aldehyde compounds such as formaldehyde, glyoxal, and glutaraldehyde; ketone compounds such as diacetyl and cyclopentadione; active halogen compounds such as bis(2-chloroethylurea)-2-hydroxy-4,6-dichloro-1,3,5-triazine, 2,4-dichloro-6-S-triazine.sodium salt; active vinyl compounds such as divinylsulfonic acid, 1,3-vinylsulfonyl-2-propanol, N,N'-ethylenebis(vinylsulfonylacetamide), and 1,3,5-triacryloyl-hexahydro-S-triazine; N-methylol compounds such as dimethylolurea, and methyloldimethylhidantoin; isocyanate compounds such as 1,6-hexamethylenediisocyanate; aziridine compounds described in U.S. Pat. Nos. 3,017,280 and 2,983,611; carboxyimide compounds described in U.S. Pat. No. 3,100,704; epoxy compounds such as glycerol triglycidyl ether; ethyleneimino compounds such as 1,6-hexamethylene-N,N'-bisethyleneurea; halogenated carboxyaldehyde compounds such as mucochloric acid and mucophenoxychloric acid; dioxane compounds such as 2,3-dihydroxydioxane; chromium alum; potassium alum; zirconium sulfate; chromium acetate; and so on.

The crosslinking agents may be used alone or in combination of two or more thereof.

The above-mentioned crosslinking agent solution is prepared by dissolving the crosslinking agent into water and/or an organic solvent.

The concentration of the crosslinking agent is preferably from 0.05 to 10% by mass, particularly preferably from 0.1 to 7% by mass of the mass of the crosslinking agent solution.

The solvent which constitutes the main portion of the crosslinking agent solution is generally water, and may be an aqueous mixed solvent containing an organic solvent miscible with water.

As the organic solvent, any solvent wherein the crosslinking agent can be dissolved may be used. Examples thereof include alcohols such as methanol, ethanol, isopropyl alcohol, and glycerin; ketones such as acetone and methyl ethyl ketone; esters such as methyl acetate and ethyl acetate; aromatic solvents such as toluene; ethers such as tetrahydrofuran; and halogenated hydrocarbon solvents such as dichloromethane.

Organic Mordant

In the invention, the colorant-accepting layer preferably contains an organic mordant, which may be referred to merely as a "mordant" hereinafter, in order to improve the water resistance of formed images and the resistance thereof against stain with the passage of time.

The mordant is preferably a cationic polymer (cationic mordant). By causing the mordant to be present in the colorant-accepting layer, the layer interacts with liquid ink containing an anionic dye as a colorant to stabilize the colorant, thereby making it possible to improve the water resistance and the resistance against stain with the passage of time.

However, if this is added directly to the first coating solution for forming the colorant-accepting layer, it is feared that aggregations are generated between the mordant and the inorganic pigment particles having anionic charges. However, if there is used the method of preparing a solution different from the inorganic pigment particle solution and applying the solution, it is unnecessary to fear aggregation of the inorganic pigment particles. Thus, in the invention, the mordant is incorporated into the second coating solution, which is different from the inorganic pigment particle solution, and then the mordant-incorporated solution is used.

As the cationic mordant, there is preferably used a polymer mordant having, as its cationic group, a primary, secondary or tertiary amino group or a quaternary ammonium salt group. A cationic non-polymer mordant can be used.

As the polymer mordant, preferred is a homopolymer of a monomer (mordant monomer) having a primary, secondary or tertiary amino group, or a salt thereof, or a quaternary salt group; or a copolymer or a condensation polymer of the mordant monomer and another monomer (referred to as a "non-mordant monomer" hereinafter). The polymer mordant can be used in the form of a water-soluble polymer or in the form of water-dispersible latex particles.

Examples of the monomer (mordant monomer) include trimethyl-p-vinylbenzylammonium chloride, trimethyl-m-vinylbenzylammonium chloride, triethyl-p-vinylbenzylammonium chloride, triethyl-m-vinylbenzylammonium chllride, N,N-dimethyl-N-ethyl-N-p-vinylbenzylammonium chloride, N,N-diethyl-N-methyl-N-p-vinylbenzylammonium chloride, N,N-dimethyl-N-n-propyl-N-p-vinylbenzylammonium chloride, N,N-dimethyl-N-n-octyl-N-p-vinylbenzylammonium chloride, N,N-dimethyl-N-benzyl-N-p-vinylbenzylammonium chloride, N,N-diethyl-N-benzyl-N-p-vinylbenzylammonium chloride, N,N-dimethyl-N-(4-methyl)benzyl-N-p-vinylbenzylammonium chloride, and N,N-dimethyl-N-phenyl-N-p-vinylbenzylammonium chloride; trimethyl-p-vinylbenzylammonium bromide, trimethyl-m-vinylbenzylammonium bromide, trimethyl-p-vinylbenzylammonium sulfonate, trimethyl-m-vinylbenzylammonium sulfonate, trimethyl-p-vinylbenzylammonium acetate, trimethyl-m-vinylbenzylammonium acetate, N,N,N-triethyl-N-2-(4-vinylphenyl)ethylammonium chloride, N,N,N-triethyl-N-2-(3-vinylphenyl)ethylammonium chloride, N,N-diethyl-N-methyl-N-2-(4-vinylphenyl)ethylammonium chloride, and N,N-diethyl-N-methyl-N-2-(4-vinylphenyl) ethylammonium acetate; quaternary salts of N,N-dimethylaminoethyl (meth)acrylate, N,N-diethylaminoethyl (meth)acrylate, N,N-dimethylaminopropyl (meth)acrylate, N,N-diethylamonopropyl (meth)acrylate, N,N-dimethylaminoethyl (meth)acrylamide, N,N-diethylaminoethyl (meth)acrylamide, N,N-dimethylaminopropyl (meth)acrylamide, and N,N-diethylaminopropyl (meth)acrylamide with methyl chloride, ethyl chloride, methyl bromide, ethyl bromide, methyl iodide or ethyl iodide, and sulfonates, alkylsulfonates, acetates and alkylcarboxylates wherein these anions are substituted.

Specific examples thereof include monomethyldiallylammonium chloride, trimethyl-2-(methacryloyloxy) ethylammonium chloride, triethyl-2-(methacryloyloxy) ethylammonium chloride, trimethyl-2-(acryloyloxy) ethylammonium chloride, triethyl-2-(acryloyloxy) ethylammonium chloride, trimethyl-3-(methacryloyloxy) propylammonium chloride, triethyl-3-(methacryloyloxy) propylammonium chloride, trimethyl-2-(methacryloylamino)ethylammonium chloride, triethyl-2-(methacryloylamino)ethylammonium chloride, trimethyl-2-(acryloylamino)ethylammonium chloride, triethyl-2-(acryloylamino)ethylammonium chloride, trimethyl-3-(methacryloylamino)propylammonium chloride, triethyl-3-(methacryloylamino)propylammonium chloride, trimethyl-3-(acryloylamino)propylammonium chloride, triethyl-3-(acryloylamino)propylammonium chloride, N,N-dimethyl-N-ethyl-2-(methacryloyloxy)ethylammonium chloride, N,N-diethyl-N-ethyl-2-(methacryloyloxy)ethylammonium chloride, N,N-dimethyl-N-ethyl-3-(acrylylamino) propylammonium chloride, trimethyl-2-(methacryloyloxy) ethylammonium bromide, trimethyl-3-(acryloylamino) propylammonium bromide, trimethyl-2-(methacryloyloxy) ethylammonium sulfonate, and trimethyl-3-(acryloylamino) propylammonium acetate.

Other examples of the monomer which can be copolymerized include N-vinylimidazol, and N-vinyl-2-methylimidazol.

The non-mordant monomer is a monomer which does not contain a basic or a cationic moiety such as a primary, secondary or tertiary amino group, or a salt thereof, or a quaternary ammonium salt group, and which exhibits no interaction with dye in inkjet ink or substantially small interaction with the dye.

Examples of the non-mordant monomer include (meth) acrylic acid alkyl esters; (meth)acrylic acid cycloalkyl esters such as cyclohexyl (meth)acrylate; (meth)acrylic acid aryl esters such as phenyl (meth)acrylate; aralkyl esters such as benzyl (meth)acrylate; aromatic vinyl compounds such as styrene, vinyltoluene and α-methylstyrene; vinyl esters such as vinyl acetate, vinyl propionate and vinyl versatate; allyl esters such as allyl acetate; halogen-containing monomers such as vinylidene chloride and vinyl chloride; vinyl cyanides such as (meth)acrylonitrile; and olefins such as ethylene and propylene.

As the above-mentioned (meth)acrylic acid alkyl esters, (meth)acrylic acid alkyl esters having an alkyl moiety having 1 to 18 carbon atoms are preferred. Examples thereof include methyl (meth)acrylate, ethyl (meth)acrylate, propyl (meth)acrylate, isopropyl (meth)acrylate, n-butyl (meth) acrylate, isobutyl (meth)acrylate, t-butyl (meth)acrylate, hexyl (meth)acrylate, octyl (meth)acrylate, 2-ethylhexyl (meth)acrylate, lauryl (meth)acrylate, and stearyl (meth) acrylate.

Preferred are methyl acrylate, ethyl acrylate, methyl methacrylate, ethyl methacrylate and methacrylate hydroxyethyl.

The non-mordant monomers may also be used alone or in combination of two or more thereof.

Preferred examples of the polymer mordant also include polydiallyldimethylammonium chloride, polymethacryloyloxyethyl-β-hydroxyethyldimethylammonium chloride, polyethyleneimine, polyallylamine, modified thereof, polyallylamine hydrochloride, polyamide-polyamine resin, cationic starch, dicyandiamide formalin condensed products, dimethyl-2-hydroxypropylammonium salt polymers, polyamidine, and polyvinyl amine. Polyallylamine and derivatives thereof are particularly preferred.

The polyallylamine derivatives are compounds obtained by adding, to polyallylamine, 2 to 50% by mole of acrylonitrile, chloromethylstyrene, TEMPO, epoxyhexane, sorbic acid or the like, and are preferably compounds obtained by adding, to polyallylamine, 5 to 10% by mole of acrylonitrile or chloromethylstyrene. Compounds obtained by adding, to polyallylamine, 5 to 10% by mole of acrylonitrile are particularly preferred since the compounds exhibit the effect of preventing ozone discoloration.

The weight average molecular weight of the mordant is preferably from 5000 to 200000. If the molecular weight is within the range of 5000 to 200000, the water resistance and the resistance against stain with the passage of time can be improved.

Other Components

The colorant-accepting layer may contain components described below if necessary.

In order to suppress deterioration of the colorant, the colorant-accepting layer may contain a discoloration inhibitor, examples of which include various ultraviolet ray absorbers, antioxidants, singlet oxygen quenchers.

Examples of the ultraviolet ray absorber include cinnamic acid derivatives, benzophenone derivatives, and benzotriazolylphenol derivatives. Specific examples thereof include butyl α-cyano-phenylcinnamate, o-benzotriazolephenol, o-benzotriazole-p-chlorophenol, o-benzotriazole-2,4-di-t-butylphenol, and o-benzotriazole-2,4-di-t-octylphenol. Hindered phenol compounds can also be used as the ultraviolet ray absorber. Specifically, preferred are phenol derivatives wherein one or more hydrogen atoms at the 2-position or 6 position thereof are substituted with branched alkyl groups.

The following may also be used: benzotriazole type ultraviolet ray absorbers, salicylic acid type ultraviolet ray absorbers, cyanoacrylate type ultraviolet ray absorbers, oxalic acid anilide type ultraviolet ray absorbers, and so on. They are described in, for example, JP-A Nos. 47-10537, 58-111942, 58-212844, 59-19945, 59-46646, 59-109055, and 63-53544, JP-B Nos. 36-10466, 42-26187, 48-30492, 48-31255, 48-41572, 48-54965, and 50-10726, and U.S. Pat. Nos. 2,719,086, 3,707,375, 3,754,919, and 4,220,711.

A fluorescent bleaching agent may also be used as the ultraviolet ray absorber. An example thereof is a coumalin-based fluorescent bleaching agent. Specifically, this agent is described in JP-B Nos. 45-4699 and 54-5324.

Examples of the antioxidant are described in EP-A Nos. 223739, 309401, 309402, 310551, 310552 and 459416, DE-A No. 3435443, JP-A Nos. 54-48535, 60-107384, 60-107383, 60-125470, 60-125471, 60-125472, 60-287485, 60-287486, 60-287487, 60-287488, 61-160287, 61-185483, 61-211079, 62-146678, 62-146680, 62-146679, 62-282885, 62-262047, 63-051174, 63-89877, 63-88380, 66-88381, 63-113536, 63-163351, 63-203372, 63-224989, 63-251282, 63-267594, 63-182484, 1-239282, 2-262654, 2-71262, 3-121449, 4-291685, 4-291684, 5-61166, 5-119449, 5-188687, 5-188686, 5-110490, 5-1108437 and 5-170361, JP-B Nos. 48-43295 and 48-33212, and U.S. Pat. Nos. 4,814,262 and 4,980,275.

Specific examples thereof include 6-ethoxy-1-phenyl-2,2,4-trimethyl-1,2-dihydroquinoline, 6-ethoxy-1-octyl-2,2,4-trimethyl-1,2-dihydroquinoline, 6-ethoxy-1-phenyl-2,2,4-trimethyl-1,2,3,4-tetrahydroquinoline, 6-ethoxy-1-octyl-2,2,4-trimethyl-1,2,3,4-tetrahydroquinoline, nickel cyclohexanoate, 2,2-bis(4-hydroxyphenyl)propane, 1,1-bis(4-hydroxyphenyl)-2-ethylhexane, 2-methyl-4-methoxy-diphenylamine, and 1-methyl-2-phenylindole.

The above-mentioned discoloration inhibitors may be used alone or in combination of two or more. The discoloration inhibitors may be dissolved in water, dispersed, emulsified, or micro-encapsulated.

The added amount of the discoloration inhibitor is preferably from 0.01 to 10% by mass of the colorant-accepting layer coating solution.

In order to improve dispersibility of the inorganic pigment particles, the colorant-accepting layer may contain various inorganic salts, and acids or alkalis as pH adjusters.

The colorant-accepting layer may contain metal oxide particles having electric conductivity in order to suppress frictional electrification or stripping electrification of the surface, and may contain various mat agents in order to decrease frictional property of the surface.

Method of Forming the Colorant-accepting Layer

The following will describe a method of forming the colorant-accepting layer. The colorant-accepting layer in the invention is preferably formed as follows: a first coating solution for the colorant-accepting layer containing at least the above-mentioned cationic polymer modified inorganic pigment particles is applied; and (1) at the same time of the application, (2) in the middle of drying the coating layer formed by the application before the coating layer undergoes falling drying rate, or (3) after the formation of a coating film by drying the coating layer, a second coating solution (crosslinking agent solution) containing at least the above-mentioned organic mordant is added to the coating layer and then the coating layer is cured and dried.

By adding the mordant together with the crosslinking agent to the second coating solution and applying them at the same time as described above, the water resistance of the colorant-accepting layer can be improved. In other words, if the mordant is added to the first coating solution, aggregation may be generated in the coexistence of the mordant and the inorganic pigment particles having anionic charges on their surfaces since the mordant is cationic; when the method of preparing the second coating solution containing the mordant and the first coating solution independently and applying the solutions separately is adopted, it is unnecessary that aggregation of the inorganic pigment particles is considered, and thus the scope for selecting the mordant is enlarged.

In the invention, the first coating solution for the colorant-accepting layer, which contains at least the cationic polymer modified inorganic pigment particles composed of the inorganic pigment particles (for example, silica particles) and the cationic polymer in the invention and may comprise the water-soluble resin (for example PVA), may be prepared as follows.

Silica particles are added to water (the amount of the silica particles: for example, 10 to 20% by mass), and further a solution containing the cationic polymer in the invention is added thereto (for example, a 30% solution in methanol is added in such a manner that the added amount of the cationic polymer in the invention will be from 0.005 to 0.05% by mass of the content of the above-mentioned gas-phase process silica). A high-speed rotation colloid mill (for example, Clearmix (M Technique Co., Ltd.) is used to disperse the particles in the solution under a high-speed rotation of, for example, 10000 rpm (preferably, 5000 to 20000 rpm) for 20 minutes (preferably, 10 to 30 minutes). Thereafter, an aqueous polyvinyl alcohol solution is added thereto (in such a manner that the mass of PVA will be, for example, about ⅓ of the silica). Furthermore, dispersion is performed under the same conditions as described above, whereby the first coating solution can be prepared. The resultant first coating solution is a uniform sol. By applying this onto a substrate in the following manner, a porous colorant-accepting layer having a three-dimensional net structure can be formed.

If necessary, a surfactant, a pH adjuster, an antistatic agent or the like may be added to the first coating solution.

The application of the first coating solution can be performed in a known manner using an extrusion die coater, an air doctor coater, a bullet coater, a rod coater, a knife coater, a squeeze coater, a reverse roll coater, a bar coater or the like.

The above-mentioned wording "the coating layer undergoes falling drying rate" usually means several minutes immediately after the first coating solution is applied, and during this time, the coating layer undergoes constant drying rate, which is a phenomenon that the content of the solvent in the applied coating layer decreases in proportion to time. The time when the constant drying rate is performed is described in "Chemical Engineering Handbook" (pp. 707–712, published on Oct. 25, 1980 by Maruzen Co., Ltd.).

As described above, the coating layer is dried till a falling drying rate is exhibited after the application of the first coating solution. The drying is generally performed at 50 to 180° C. for 0.5 to 10 minutes (preferably, 0.5 to 5 minutes). About the time for the drying, which naturally varies the applied amount of the coating solution, the above-mentioned range is proper.

Examples of the method of adding the (second) coating solution containing the organic solvent solution before the coating layer undergoes falling drying rate include (1) a method of applying the second coating solution onto the coating layer, (2) a method of spraying the second coating solution with a spray or the like, and (3) a method of immersing the substrate on which the coating layer is formed into the second coating solution.

In the method (1), examples of the manner of applying the second coating solution include known manners using a curtain flow coater, an extrusion die coater, an air doctor coater, a bullet coater, a rod coater, a knife coater, a squeeze coater, a reverse roll coater, a bar coater or the like. It is preferred to use a manner wherein a coater does not directly contact the coating layer which has already been formed. Examples thereof include manners using an extrusion die coater, a curtain flow coater or a bar coater. In these manners, two or more coating solutions may be simultaneously applied in to the form of layers.

The simultaneous application (multilayer application) can be performed, for example, in a coating manner of using an extrusion die coater or a curtain flow coater. After the simultaneous application, the formed coating layer is dried. The drying in this case is generally performed by heating the coating layer at 40 to 150° C. for 0.5 to 10 minutes, preferably at 40 to 100° C. for 0.5 to 5 minutes.

For example, in the case that borax or boric acid is used as the crosslinking agent contained in the second coating solution, the coating layer is preferably heated at 60 to 100° C. for 5 to 20 minutes.

In the case that after the coating layer is dried to form a coating film the second coating solution is added thereto, the drying of the coating layer is performed by heating the coating layer at 40 to 150° C. for 0.5 to 10 minutes, preferably at 40 to 100° C. for 0.5 to 5 minutes.

The crosslinking agent can be supplied onto the substrate by adding the crosslinking agent to either of the first coating solution or the second coating solution. The crosslinking agent may be supplied by preparing a solution containing the crosslinking agent separately from the first and second coating solutions and applying the solution at either stage of the coating solution-applying steps.

In the respective stages of the above-mentioned application steps, water, an organic solvent or a mixed solution thereof can be used as a solvent. Examples of the organic solvent which can be used for the application include alcohols such as methanol, ethanol, n-propanol, i-propanol, and methoxypropanol; ketones such as acetone and methyl ethyl ketone; tetrahydrofuran; acetonitrile; ethyl acetate; and toluene.

After the colorant-accepting layer is formed on the substrate, the colorant-accepting layer may be subjected to calendar treatment by passing the substrate through a roll nip under pressure while being heated using a super calendar, a gloss calendar or the like, whereby the surface smoothness, glossiness, transparency and coating film strength of the layer can be improved. However, the calendar treatment may cause a drop in the porosity of the layer (that is, the ink absorbing ability may drop); therefore, it is necessary that conditions for making the drop in the porosity small are set and the calendar treatment is conducted.

The roll temperature at the time of conducting the calendar treatment is preferably from 30 to 150° C., preferably from 40 to 100° C.

The line pressure between rolls at the time of the calendar treatment is preferably from 50 to 400 kg/cm, more preferably from 100 to 200 kg/cm.

Since the inkjet recording sheet is required to have an absorbing capacity for absorbing all ink droplets, it is necessary to decide the thickness of the colorant-accepting layer, considering relationship with the porosity of the layer. For example, in the case that the amount of ink is 8 nL/mm$^2$ and the porosity is 60%, it is necessary to set the thickness to 15 $\mu$m or more.

Considering this matter, the thickness of the colorant-accepting layer is preferably from 10 to 50 $\mu$m in the case of inkjet recording.

The median pore size of the colorant-accepting layer is preferably from 0.005 to 0.030 $\mu$m, more preferably from 0.01 to 0.025 $\mu$m.

The porosity and the median pore size can be measured with a mercury porosity meter (trade name: Boresizer, 9320-PC2, made by Shimadzu Corp.).

It is preferred that the colorant-accepting layer is superior in transparency. For reference, the haze value obtained when the colorant-accepting layer is formed on a transparent film substrate is preferably 30% or less, more preferably 20% or less.

The haze value can be measured with a haze mater (HGM-2DP, made by Suga Test Instruments Co., Ltd.).

Substrate

As the substrate, a transparent substrate made of a transparent material such as plastic, or nontransparent substrate made of a nontransparent material such as paper can be used. In order to make good use of the transparency of the colorant-accepting layer, it is preferred to use a transparent substrate or a nontransparent substrate having a high glossiness.

The material that can be used for the transparent substrate is preferably a material which has transparency and has resistance against radiant heat when it is used in an OHP or a backlight display. Examples thereof include polyesters such as polyethylene terephthalate (PET); polysulfone; polyphenylene oxide; polyimide; polycarbonate; and polyamide. Among these examples, polyesters are preferred. PET is particularly preferred.

The thickness of the transparent substrate is not particularly limited, and is preferably from 50 to 200 $\mu$m in light of handling performance.

The nontransparent substrate having a good glossiness is preferably a substrate wherein its surface on which the colorant-accepting layer is to be deposited has a glossiness of 40% or more. The glossiness is a value obtained by the method described in JIS P-8142 (75-degree mirror plane glossiness test for paper and paperboard).

Specific examples thereof include highly glossy paper substrates such as art paper, coated paper, cast-coated paper, and baryta paper used for a silver salt photographic substrate; polyesters such as polyethylene terephthalate (PET); cellulose esters such as nitrocellulose, cellulose acetate, and cellulose acetate butyrate; highly glossy films which are obtained by incorporating white pigment or the like into a plastic film made of polysulfone, polyphenylene oxide, polyimide, polycarbonate, polyamide or the like (and which may be subjected to calendar treatment); and substrates wherein a polyolefin coating layer which contains or does not contain white pigment is deposited on the surface of any one of the above-mentioned various paper substrates, transparent substrates and highly-glossy films containing white pigment or the like.

Other preferred examples include white pigment-containing expanded polyester film (for example, expanded PET, which contains polyolefin particles and is extended to form voids).

The thickness of the nontransparent substrate is not particularly limited, and is preferably from 50 to 300 μm from the viewpoint of handling performance.

The substrate may be subjected to corona discharge treatment, glow discharge treatment, flame treatment, ultraviolet ray radiating treatment or the like.

The following will describe base paper used in the paper substrate in detail.

The base paper is made using wood pulp as a main material, or using synthetic pulp such as polypropylene pulp or synthetic fiber such as nylon or polyester fiber, if necessary. As the wood pulp, any one selected from the following can be used: LBKP, LBSP, NBKP, NBSP, LDP, NDP, LUKP and NUKP. It is preferred to use LBKP, NBSP, LBSP, NDP or LDP, which contains short fiber at a large ratio.

However, it is preferred that the ratio of LBSP and/or LDP is 10% or more and 70% or less by mass.

As the above-mentioned pulp, chemical pulp containing impurities at a small ratio (sulfate pulp or sulfite pulp) is preferably used. Pulp whose whiteness is improved by bleaching treatment is also useful.

The following may be properly added to the base paper: a sizing agent such as a higher fatty acid or alkylketene dimmer, a white pigment such as calcium carbonate, talc or titanium oxide, a paper durability enhancer such as starch, polyacrylamide or polyvinyl alcohol, a fluorescent bleaching agent, a water content holding agent such as polyethylene glycol, a dispersing agent, a softening agent such as quaternary ammonium, or the like.

About the freeness of the pulp used in papermaking, the value according to the rule of CSF is preferably from 200 to 500 ml. About the fiber length after beating, the sum of the mass percentage of a 24-mesh residue and the mass percentage of a 42-mesh residue, which are defined in JIS P-8207, is preferably from 30 to 70%. The mass percentage of a 4-mesh residue is preferably 20% or less.

The grammage(basic weight) of the base paper is preferably from 30 to 250 g, more preferably from 50 to 200 g. The thickness of the base paper is preferably from 40 to 250 μm. A high smoothness can be given to the base paper by subjecting the base paper to calendar treatment during or after the papermaking thereof. The density of the base paper is generally from 0.7 to 1.2 g/cm$^2$ (JIS P-8118).

The rigidity of the base paper is preferably from 20 to 200 g under conditions prescribed in JIS P-8143.

A surface sizing agent may be applied to the surface of the base paper. As the surface sizing agent, the same sizing agent as can be added to the base paper can be used.

The pH of the base paper is preferably from 5 to 9 when the pH is measured by the hot water extracting method prescribed in JIS P-8113.

The polyethylene which the front and rear faces of the base paper are coated with is generally low-density polyethylene (LDPE) and/or high-density polyethylene (HDPE). However, a part of LLDPEs and polypropylenes may be used.

It is particularly preferred to use, as the polyethylene layer on which the colorant-accepting layer is formed, a layer wherein a rutile or anatase type titanium oxide is added to polyethylene to improve non-transparency or whiteness as widely performed in photographic paper. The titanium oxide content by percentage is generally from 3 to 20%, preferably form 4 to 13% by mass of the polyethylene.

The polyethylene-coated paper may be used as glassy paper, or as paper having a mat surface or a fine grain photoprint surface as can be obtained in ordinary photographic paper by performing the so-called pattern-applying treatment when polyethylene is melted and extruded onto the surface of base paper and applied onto the surface.

As described above, according to the invention, the printing density of images can be improved without lowering other ink performances. Furthermore, when its colorant-accepting layer contains inorganic pigment particles to have a three-dimensional net structure having a porosity of 50 to 80%, a good ink-absorbing ability is exhibited so that images having a high resolution can be formed. At the same time, superior ink receptivity performance can be ensured. That is, for example, stain with ink with the passage of time is suppressed under high-temperature and high-humidity environment, and the formed images also exhibit high light resistance and water resistance.

EXAMPLES

The invention will be described by way of Examples hereinafter. However, the invention is not limited to these examples. In the examples, the word "part(s)" and the symbol "%" represent "part(s) by mass" and "% by mass", respectively, unless otherwise specified. The symbol "WM" and the word "polymerization degree" represent "weight average molecular weight" and "weight average polymerization degree", respectively.

Synthesis Examples of Cationic Polymers in the Invention

Synthesis Example 1

Into 70 parts of methanol were dissolved 30 parts of N-[2-(methacryloyloxy)ethyl]-N,N,N-trimethylammonium chloride and 2.8 parts of 3-mercaptopropyltrimethoxysilane, and the solution was heated to 650° C. under nitrogen flow. Thereto was added 0.16 parts of a polymerization initiator (V-50, made by Wako Pure Chemical Industries, Ltd.). The solution was further heated for 4 hours, so as to yield a 30% solution of a cationic polymer 1 [a cationic polymer represented by the general formula (A) containing a recurring unit represented by the general formula (2) (a cationic polymer represented by the general formula (A))] in methanol.

The following was yielded in the same manner as in Synthesis Example 1 except that the added amount of 3-mercaptopropyltrimethoxysilane was changed from 2.8 parts to 1.4 parts: a 30% solution of a cationic polymer B [a cationic polymer represented by the general formula (1) containing a recurring unit represented by the general formula (2) (a cationic polymer represented by the general formula (A))] in methanol.

Synthesis 3

The following was yielded in the same manner as in Synthesis Example 1 except that 30 parts of N-[2-(methacryloyloxy)ethyl]-N,N,N-trimethylammonium chloride were changed to 30 parts of N-[3-(methacryloylamino)propyl]-N,N,N-trimethylammonium chloride: a 30% solution of a cationic polymer C [a cationic polymer represented by the general formula (1) containing a recurring unit represented by the general formula (2) (a cationic polymer represented by the general formula (A))] in methanol.

Synthesis 4

The following was yielded in the same manner as in Synthesis Example 1 except that 30 parts of N-[2-(methacryloyloxy)ethyl]-N,N,N-trimethylammonium chloride were changed to 30 parts of N-[2-(methacryloyloxy)ethyl]-N-benzyl-N,N-dimethylammonium chloride: a 30% solution of a cationic polymer D [a cationic polymer represented by the general formula (1) containing a recurring unit represented by the general formula (2) (a cationic polymer represented by the general formula (A))] in methanol.

Synthesis 5

The following was yielded in the same manner as in Synthesis Example 1 except that 30 parts of N-[2-(methacryloyloxy)ethyl]-N,N,N-trimethylammonium chloride were changed to 30 parts of N,N,N-trimethyl-N-

(vinylbenzyl)ammonium chloride: a 30% solution of a cationic polymer E [a cationic polymer represented by the general formula (1) containing a recurring unit represented by the general formula (2) (a cationic polymer represented by the general formula (A))] in methanol.

Synthesis 6

A 30% solution of a cationic polymer F in methanol was yielded in the same manner as in Synthesis Example 1 except that 30 parts of N-[2-(methacryloyloxy)ethyl]-N,N,N-trimethylammonium chloride were changed to 30 parts of N,N,N-trimethyl-N-vinylbenzylammonium chloride.

Synthesis 7

A 30% solution of a cationic polymer G in methanol was yielded in the same manner as in Synthesis Example 1 except that 30 parts of N-[2-(methacryloyloxy)ethyl]-N,N,N-trimethylammonium chloride were changed to 30 parts of N,N,N-triethyl-N-vinylbenzylammonium chloride.

Comparative Synthesis Example 1

A 30% solution of a cationic polymer H [comparative cationic polymer] in methanol was yielded in the same manner as in Synthesis Example 1 except that 2.8 parts of 3-mercaptopropyltrimethoxysilane were changed to 1.1 parts of 2-mercaptoethanol.

Production of an Inkjet Recording Sheet

Example 1

Formation of a Substrate

Art paper having a grammage of 186 g/m$^2$ (OK Kinfuji, made by Oji Paper Co., Ltd.) was subjected to corona discharge treatment, and then a melting extruder was used to apply a high-density polyethylene to the art paper to have a thickness of 19 μm. In this way, a resin layer having a mat surface was formed (the resin layer surface will be referred to as the "rear face" hereinafter). This rear face was further subjected to corona discharge treatment, and then coated with a dispersion solution wherein aluminum oxide (Alumina sol 100, made by Nissan Chemical Industries, Ltd.) and silicon dioxide (Snowtex, made by Nissan Chemical Industries. Ltd.) were dispersed in water at a weight ratio of 1:2, as an antistatic agent, in such a manner that the dry mass of the dispersion solution would be 0.2 g/m$^2$.

Furthermore, the felt face on which no resin layer was deposited (i.e., the right face) was subjected to corona discharge treatment, and then a melting extruder was used to melt and extrude a low-density polyethylene having a MFR (melt flow rate) of 3.8 and containing anatase type titanium dioxide (10%), ultramarine blue (a very small amount) and a fluorescent bleaching agent (0.01% of the polyethylene), so as to have a thickness of 24 μm. In this way, a highly-glossy thermoplastic resin layer was formed on the right face of the base paper (this highly-glossy face will be referred to as the "front face" hereinafter), so as to prepare a substrate. The substrate would be used in the state that the front face thereof would be subjected to corona discharge treatment before a coating solution was applied thereto.

Preparation of a Colorant-accepting Layer Coating Solution (First Coating Solution)

Gas-phase process silica particles (1) were mixed with ion exchange water (2) having a composition described below, and then the mixture was mixed with a 30% solution (3) of the above-mentioned cationic polymer A in methanol. A nanomizer (made by Nanomizer Co., Ltd.) was used to perform blend treatment two times at a pressure of 500 kg/m$^2$, and then the mixture was stirred for 60 minutes, and thereto was added an aqueous 8% solution (4) of polyvinyl alcohol, having a composition described below, under stirring. Furthermore, thereto were added a (10%) aqueous solution (5) of EMULGEN 109P and diethylene glycol monobutyl ether (6), so as to prepare a colorant-accepting layer coating solution A (first coating solution). The mass ratio (PB ratio) of the silica particles to the water-soluble resin ((1):(4)) was 4.5:1.

[Composition of the colorant-accepting layer coating solution A]

| | |
|---|---|
| (1) Gas-phase silica particles (inorganic pigment particles) (Specific surface area according to the BET method: 300 m$^2$/g, average primary particle size: 7 nm, QS-30, made by Tokuyama Corp.) | 7.7 parts |
| (2) Ion exchange water | 72.4 parts |
| (3) 30% Solution of the cationic polymer A in methanol | 0.26 parts |
| (4) Aqueous 8% solution of polyvinyl alcohol (PVA124, made by Kuraray Co., Ltd., saponification degree: 98.5%, polymerization degree: 2400) | 21.3 parts |
| (5) Polyoxyethylene lauryl ether (Nonionic surfactant) EMULGEN 109P (10%), made by Kao Corporation) | 1.0 part |
| (6) Diethylene glycol monobutyl ether (DEGMBE) | 0.6 parts |

High Boiling Point Organic Solvent

Production of an Inkjet Recording Sheet

An extrusion die coater was used to apply the colorant-accepting layer coating solution A obtained as described above to the front face of the substrate at an application amount of 200 ml/m$^2$ (applying step). The substrate was dried at 80° C. with a hot-air drier until the solid content concentration in the coating layer was 20%. The coating layer exhibited a constant drying rate during this period. Immediately after this, the substrate was immersed into a crosslinking agent solution A (second coating solution) having a composition described below for 30 seconds, so that the solution (amount: 20 g/m$^2$) was adhered onto the coating layer (crosslinking agent adding step). Next, the substrate was dried at 80° C. for 10 minutes (drying step), thereby producing an inkjet recording sheet (1) of the invention, on which a colorant-accepting layer having a dry film thickness of 32 μm was formed.

[Composition of the crosslinking agent solution A]

| | |
|---|---|
| Boric acid (crosslinking agent) | 2.5 parts |
| Ion exchange water | 69.5 parts |
| 10% Aqueous polyallyamine solution (organic mordant; WM: 10000) | 25 parts |
| Polyoxyethylene lauryl ether (nonionic surfactant) (EMULGEN 109P (10%), made by Kao Corporation) | 2 parts |
| Ammonium chloride | 1 part |

Evaluation Method

1. Evaluation of the Colorant-accepting Layer Coating Solution (1-1) Dispersion State Three hundred grams of the colorant-accepting layer coating solution A was collected in a 500-ml container. The container was immersed in a thermostat tank of 30° C. temperature for 10 minutes. Thereafter, a B type viscometer (made by Tokimec Inc.) was used to measure the viscosity of the solution A at a rotation speed of 60 rpm. In accordance with a criterion described below, the dispersion state of the colorant-accepting layer coating solution A was evaluated. The result is shown in Table 1.

Criterion

AA: The viscosity was less than 100 mPa·s, and the solution, which was in a good dispersion state, was able to be applied.

BB: The viscosity was 100 mPa·s or more and less than 1000 mPa·s, and the solution was in a dispersion state disturbing application (or coating) to some degree.

CC: The viscosity was 1000 mPa·s or more, and the solution was in a dispersion state making application impossible.

(1-2) Average Particle Size

A particle size distribution measuring device of a light scattering diffraction type (LA910, made by Horiba Ltd.) was used to measure the volume-based middle particle size D50 of the particles in the colorant-accepting layer coating solution A. This value was adopted as an average particle size, and the solution was evaluated in accordance with a criterion described below. The result is shown in Table 1. In the measurement, a refractive index of 1.10 was inputted as a parameter.

Criterion

AA: less than 0.2 µm

BB: 0.2 µm or more, and less than 5.0 µm

CC: 5 µm or more (1-3) Coarse Particles

In the item (1-2), the ratio of particles having a particle size of 5 µm or more in all of the particles was calculated, and the solution A was evaluated on the basis of the ratio. The result is shown in Table 1.

Criterion

AA: less than 2%

BB: 2% or more, and less than 10%

CC: 10% or more

2. Evaluation of the Inkjet Recording Sheet (2-1) Glossiness

The 60°-glossiness of the surface of the colorant-accepting layer of the recording sheet before any image was printed was measured with a digital angle-variable gloss-meter (UGV-50DP, made by Suga Test Instruments Co., Ltd.), and the recording sheet was evaluated in accordance with a criterion described below. The result is shown in Table 2.

Criterion

AA: The glossiness was 40 or more.

BB: The glossiness was 30 or more and less than 40.

CC: The glossiness was less than 30.

(2-2) Ink-absorbing Rate

An inkjet printer (PM-900C, made by Seiko Epson Corporation) was used to print solid images in yellow (Y), magenta (M), cyan (C), black (K), blue (B), green (G) and red (R) on the inkjet recording sheet. Immediately after this (i.e., after 10 seconds), paper was brought into contact with and pressed against the images, and the state of the transfer on the inks onto the paper was evaluated in accordance with a criterion described below. The result is shown in Table 2.

Criterion

AA: The transfer of the inks on the paper was not observed at all. This demonstrates that the ink-absorbing rate was good.

BB: A part of the inks was transferred onto the paper. No problem was caused for practice.

CC: A large amount of the inks was transferred onto the paper.

(2-3) Generation of a Crack

It was observed whether or not a crack was generated in the surface of the inkjet recording sheet, and the size of the crack was also observed with the naked eye. Evaluation was then made in accordance with a criterion described below. The result is shown in Table 2.

Criterion

AA: Cracks were not observed in the surface at all.

BB: A crack having a length of 1 to 2 mm was observed.

CC: A crack having a length of 3 mm or more was observed.

(2-4) Water Resistance

The same printer as in the item (2-2) was used to form the same image pattern on the inkjet recording sheet, and the sheet was allowed to stand still for 3 hours. Thereafter, the sheet was immersed in water for 1 minute, and the degree of the flowing of the inks into the water was observed with the naked eye. Evaluation was then made in accordance with a criterion described below. The result is shown in Table 2.

Criterion

AA: Flowing-out of the dyes was not observed at all.

BB: A portion where the dyes flowed out was observed, and the color densities were lowered.

CC: Almost all of the dyes flowed out in the water.

(2-5) Stain with the Passage of Time

The same printer as in the item (2-2) was used to print a lattice line pattern (line width: 0.28 mm), wherein a magenta ink and a black ink were adjacent to each other, on the inkjet recording sheet. With a device X Rite 310TR (made by X Rite Co.), the visual density thereof was measured. For 3 hours after the printing, the recording sheet was allowed to stand still. Thereafter, the sheet was stored in a constant-temperature and constant-humidity tank having a temperature of 40° C. and a humidity of 90% for one day, and then the visual density was again measured. A difference (ΔOD) between the densities was calculated. Evaluation was then made in accordance with a criterion described below. As the difference (ΔOD) is smaller, the generation of stain with the passage of time is more suppressed. The result is shown in Table 2.

Criterion

AA: The density difference was less than 0.36.

BB: The density difference was 0.36 or more and less than 0.5.

CC: The density difference was 0.5 or more.

(2-6) Light Resistance

The same printer as in the item (2-2) was used to print solid images in yellow (Y), magenta (M), cyan (C) and black (B) on the inkjet recording sheet, and the visual densities of the respective colors were measured with the device X Rite 310TR (made by X Rite Co.). Thereafter, a device Xenon weather-o-meter Ci65A (made by Atlas Co.) was used to radiate light from its lamp to the printed images, through a film for cutting ultraviolet rays having wavelengths of 365 nm or less, at a temperature of 25° C. and a relative humidity of 32% for 3.8 hours. Thereafter, the sheet was allowed to stand still at a temperature of 20° C. and a relatively humidity of 91% for 1 hour in the state that the lamp was turned off. This cycle was performed for 11 days. Thereafter, the visual densities of the respective colors were again measured to calculate the residual ratio of each of the colors (the ratio between the densities before and after the test). Evaluation was then made in accordance with a criterion described below. The result is shown in Table 2.

Criterion

AA: Discoloration hardly advanced.

BB: Discoloration advanced slightly.

CC: Discoloration advanced considerably.

(2-7) Image Density (Printing Density)

The same printer as in the item (2-2) was used to print a solid image in black (K) on the inkjet recording sheet. After the sheet was allowed to stand still for 3 hours, the reflection density of the printed face was measured with a Macbeth reflection density meter. Evaluation was then made in accordance with a criterion described below. The result is shown in Table 2.

Criterion

AA: The reflection density was 2.0 or more.

BB: The reflection density was 1.8 or more and less than 2.0.

CC: The reflection density was less than 1.8.

Examples 2 to 9, and Comparative Examples 1 to 4

Colorant-accepting layer coating solutions were prepared and evaluated in the same way as in Example 1 except that the cationic polymer A in the colorant-accepting layer coating solution A of Example 1 and the added amount thereof were changed to each of cationic polymers shown in Table 1 and the added amount thereof shown in the same table. The results are shown in Table 1. Furthermore, the respective colorant-accepting layer coating solutions were used to yield inkjet recording sheets in the same way as in Example 1 (Examples 2 to 9 and Comparative Examples 1 to 4). The results are shown in Table 2. In Comparative Examples 3 and 4, the viscosity of the colorant-accepting layer coating solutions were high so that each of the solutions was unable to be applied on the substrate.

It can be understood from Table 2 that the inkjet recording sheet of the invention, which can be formed from the colorant-accepting layer coating solution to which the cationic polymer in the invention is added and which contain cationic polymer modified inorganic pigment particles, is superior in glossiness, ink-absorbing rate, resistance against cracks, water resistance, resistance against stain with the passage of time, light resistance, and printing density.

TABLE 1

|  | Cationic polymer | Added amount of 30% solution of cationic polymer | Viscosity | Particle size | Coarse particles |
|---|---|---|---|---|---|
| Example 1 | Cationic polymer A | 0.26 parts | AA | AA | AA |
| Example 2 | Cationic polymer B | 0.26 parts | AA | AA | AA |
| Example 3 | Cationic polymer C | 0.26 parts | AA | AA | AA |
| Example 4 | Cationic polymer D | 0.26 parts | AA | AA | AA |
| Example 5 | Cationic polymer E | 0.26 parts | AA | AA | AA |
| Example 6 | Cationic polymer F | 0.26 parts | AA | AA | AA |
| Example 7 | Cationic polymer G | 0.26 parts | AA | AA | AA |
| Example 8 | Cationic polymer A | 0.13 parts | AA | AA | AA |
| Example 9 | Cationic polymer A | 0.51 parts | AA | AA | AA |
| Comparative Example 1 | Cationic polymer H | 0.26 parts | BB | BB | BB |
| Comparative Example 2 | Polymonomethyldiallyl ammonium chloride | 1.30 parts | AA | AA | AA |
| Comparative Example 3 | Polyallylamine hydrochloride | 1.30 parts | CC | CC | CC |
| Comparative Example 4 | None | — | CC | CC | CC |

It can be understood from Table 1 that the colorant-accepting layer coating solution to which the cationic polymer in the invention is a dispersion solution which can suppress aggregation between gas-phase particles to exhibit good fluidity.

On the other hand, the colorant-accepting layer coating solution (Comparative Example 1) using the comparative cationic polymer H was poor in the evaluations about average particle size and coarse particles. About the colorant-accepting layer coating solution using polymonomethyldiallylammonium chloride or polyallylamine hydrochloride, it was necessary that a large amount thereof was added. The colorant-accepting layer coating solution using polyallylamine hydrochloride (Comparative Example 3) and the colorant-accepting layer coating solution using no cationic polymer (Comparative Example 4) had a high viscosity and were unable to be applied to the surface of the substrate.

On the other hand, in Comparative Example 1 using no cationic polymer in the invention, the colorant-accepting layer was cracked and the image density was lowered. In Comparative Example 2, stain was generated with the passage of time, and the light resistance was also low. In Comparative Examples 3 and 4, the colorant-accepting layer coating solutions had a high viscosity so that no inkjet recording sheet was able to be produced. Thus, no evaluation was able to be made.

The invention provides a cationic polymer which reacts easily with inorganic pigment particles to prevent aggregation thereof. The invention can also provide an inkjet recording sheet exhibiting a high printing density without lowering other ink receptivity performances. Furthermore, the invention can provide an inkjet recording sheet which is strong because of no generation of cracks, has a good ink-absorbing ability and can form a high-resolution image. The invention can also provide an inkjet recording sheet

TABLE 2

|  | Colorant-accepting layer coating solution | Glossiness | Crack | Ink-absorbing rate | Printing density | Water resistance | Stain with the passage of time | Light resistance |
|---|---|---|---|---|---|---|---|---|
| Example 1 | Example 1 | AA | AA | AA | AA | AA | AA | AA |
| Example 2 | Example 2 | AA | AA | AA | AA | AA | AA | AA |
| Example 3 | Example 3 | AA | AA | AA | AA | AA | AA | AA |
| Example 4 | Example 4 | AA | AA | AA | AA | AA | AA | AA |
| Example 5 | Example 5 | AA | AA | AA | AA | AA | AA | AA |
| Example 6 | Example 6 | AA | AA | AA | AA | AA | AA | AA |
| Example 7 | Example 7 | AA | AA | AA | AA | AA | AA | AA |
| Example 8 | Example 8 | AA | AA | AA | AA | AA | AA | AA |
| Example 9 | Example 9 | AA | AA | AA | AA | AA | AA | AA |
| Comparative Example 1 | Comparative Example 1 | AA | BB | AA | CC | AA | AA | AA |
| Comparative Example 2 | Comparative Example 2 | AA | AA | AA | BB | AA | BB | BB |

What is claimed is:

1. An inkjet recording sheet, which has, on a substrate, a colorant-accepting layer including a water soluble resin and cationic polymer modified inorganic pigment particles obtained by bonding inorganic pigment particles to the terminal position of a cationic polymer having, at its terminal, a group that can be bonded to the inorganic pigment particles.

2. The inkjet recording sheet according to claim 1, wherein the cationic polymer having, at its terminal, the group that can be bonded to the inorganic pigment particles has the group that can be bonded to the inorganic pigment particles at only a single terminal.

3. The inkjet recording sheet according to claim 1, wherein the group that can be bonded to the inorganic pigment particles is an alkoxysilyl group.

4. The inkjet recording sheet according to claim 1, wherein the cationic polymer having, at its terminal, the group that can be bonded to the inorganic pigment particles is represented by the following general formula (I):

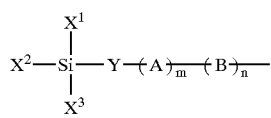

General formula (1)

wherein $X^1$, $X^2$ and $X^3$ each independently represent a hydrogen atom, or an alkyl group having 1 to 18 carbon atoms or an alkoxy group or an aryloxy group having 1 to 8 carbon atoms, each of which may contain a saturated or unsaturated cyclic structure; at least one of $X^1$, $X^2$ and $X^3$ represents the alkoxy group or the aryloxy group; Y represents a bivalent linking group having 1 to 18 carbon atoms, which may have a substituent and may have a linking heteroatom therein; A represents at least one recurring unit having a cation; B represents at least one recurring unit which can be copolymerized with A; and m and n represent the mole ratios of the A component and the B component, respectively, where $0.2 \leq m \leq 1.0$, and $0 \leq n \leq 0.8$ (m+n=1.0).

5. The inkjet recording sheet according to claim 4, wherein the recurring unit A in the general formula (I) is at least one selected from the following recurring units (I) to (IV):

(I) a recurring unit represented by the following general formula (2):

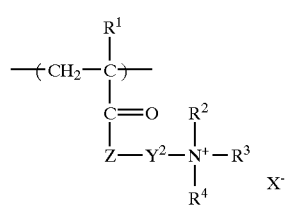

General formula (2)

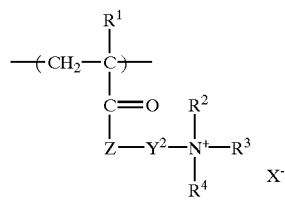

General formula (2)

wherein $R^1$ represents a hydrogen atom or an alkyl group having 1 to 4 carbon atoms; $R^2$, $R^3$ and $R^4$ each independently represent a hydrogen atom, or an alkyl group having 1 to 18 carbon atoms, an aryl group or an aralkyl group, each of which may have a substituent and may be linked to form a saturated or unsaturated cyclic structure; Z represents —O— or —NH—; $Y^2$ represents a bivalent linking group having 1 to 8 carbon atoms, which may have therein a linking heteroatom; and $X^-$ represents an anion, (II) a recurring unit represented by the following general formula (3):

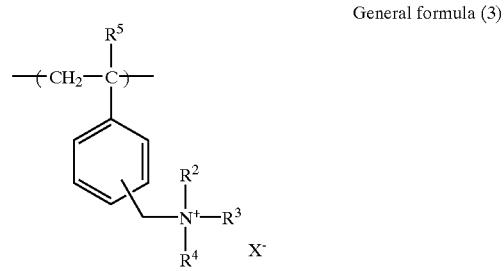

General formula (3)

wherein $R^5$ represents a hydrogen atom or a methyl group; and $R^2$, $R^3$, $R^4$ and $X^-$ are as defined in the general formula (2), (III) at least one recurring unit selected from units represented by the following general formulae (4) and (5):

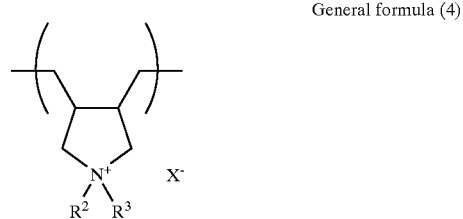

General formula (4)

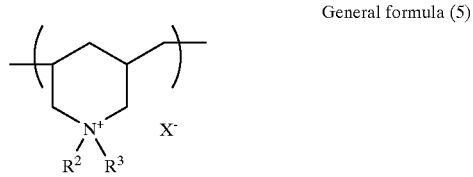

General formula (5)

wherein $R^2$, $R^3$ and $X^-$ are as defined in the general formula (2), and (IV) at least one recurring unit selected from recurring units represented by the following general formulae (6) and (7):

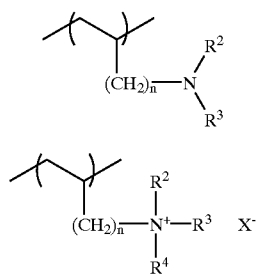

General formula (6)

General formula (7)

wherein n is 0 or 1; and $R^2$, $R^3$, $R^4$ and $X^-$ are as defined in the general formula (2).

6. The inkjet recording sheet according to claim 1, wherein the mass ratio (x:y) of the inorganic pigment particles (x) to the cationic polymer (y) having, at its terminal, the group that can be bonded to the inorganic pigment particles, ranges from 1:0.001 to 1:0.2.

7. The inkjet recording sheet according to claim 4, wherein the mass ratio (x:y) of the inorganic pigment particles (x) to the cationic polymer (y) having, at its terminal, the group that can be bonded to the inorganic pigment particles, ranges from 1:0.001 to 1:0.2.

8. The inkjet recording sheet according to claim 5, therein the mass ratio (x:y) of the inorganic pigment particles (x) to the cationic polymer (y) having, at its terminal, the group that can be bonded to the inorganic pigment particles ranges from 1:0.001 to 1:0.2.

9. The inkjet recording sheet according to claim 1, wherein the kind of the inorganic pigment particles is one or more selected from kinds of silica particles, colloidal silica, alumina particles and pseudo-boehmite.

10. The inkjet recording sheet according to claim 4, wherein the kind of the inorganic pigment particles is one or more selected from kinds of silica particles, colloidal silica, alumina particles and pseudo-boehmite.

11. The inkjet recording sheet according to claim 4, wherein the colorant-accepting layer further contains a water-soluble resin.

12. The inkjet recording sheet according to claim 1, wherein the water-soluble resin is one or more selected from polyvinyl alcohol resins, cellulose resins. resins having an ether bond, resins having a carbamoyl group, resins having a carboxyl group, and gelatins.

13. The inkjet recording sheet according to claim 11, wherein the water-soluble resin is one or more selected from polyvinyl alcohol resins, cellulose resins, resins having an ether bond, resins having a carbamoyl group, resins having a carboxyl group, and gelatins.

14. The inkjet recording sheet according to claim 1, wherein the colorant-accepting layer further contains a crosslinking agent capable of crosslinking the water-soluble resin.

15. The inkjet recording sheet according to claim 11, wherein the colorant-accepting layer further contains a crosslinking agent capable of crosslinking the water-soluble resin.

16. The inkjet recording sheet according to claim 1, wherein the colorant-accepting layer further contains a mordant.

17. The inkjet recording sheet according to claim 4, wherein the colorant-accepting layer further comprises a mordant.

18. An inkjet recording sheet according to claim 16, wherein the colorant-accepting layer is a layer obtained by crosslinking and curing a coating layer obtained by coating with a coating solution containing at least particles and a water-soluble resin, and the crosslinking and curing are performed by adding the crosslinking agent to the coating solution and/or a basic solution having a pH of 8 or more and applying the basic solution to the coating layer (I) at the same time of forming the coating layer by coating with the coating solution or (2) in the middle of drying the coating layer formed by coating with the coating solution before the coating layer undergoes falling drying rate.

* * * * *